US008143574B2

(12) United States Patent
Endo

(10) Patent No.: US 8,143,574 B2
(45) Date of Patent: Mar. 27, 2012

(54) METHOD AND APPARATUS FOR COMPENSATING INFRARED SENSOR FOR TEMPERATURE

(75) Inventor: Tsutomu Endo, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 699 days.

(21) Appl. No.: 12/010,743

(22) Filed: Jan. 29, 2008

(65) Prior Publication Data

US 2010/0288915 A1 Nov. 18, 2010

(30) Foreign Application Priority Data

Jan. 30, 2007 (JP) .................................. 2007-019452

(51) Int. Cl.
*G01J 5/02* (2006.01)
(52) U.S. Cl. ...................... 250/330; 250/332; 250/338.1; 250/252.1; 702/99; 374/1; 374/3
(58) Field of Classification Search .................. 250/330, 250/332, 336.1, 338.1, 339.14, 252.1; 374/1, 374/3; 702/99
See application file for complete search history.

(56) References Cited

U.S. PATENT DOCUMENTS

| 4,537,516 | A | * | 8/1985 | Epstein ............................. 374/1 |
| 5,589,876 | A | | 12/1996 | Konuma | |
| 5,688,699 | A | * | 11/1997 | Cunningham et al. .......... 438/54 |
| 5,994,701 | A | | 11/1999 | Tsuchimoto et al. | |
| 6,476,392 | B1 | | 11/2002 | Kaufman et al. | |
| 6,730,909 | B2 | * | 5/2004 | Butler ......................... 250/338.1 |
| 7,034,301 | B2 | | 4/2006 | Parrish et al. | |
| 2003/0122077 | A1 | * | 7/2003 | Kaufman et al. ............. 250/332 |
| 2008/0210872 | A1 | * | 9/2008 | Grimberg ................. 250/339.04 |

FOREIGN PATENT DOCUMENTS

| EP | 0 324 925 | 5/1995 |
| EP | 0 837 600 | 4/1998 |
| JP | 2003-532111 | 10/2003 |
| JP | 2005-519266 | 6/2005 |
| WO | WO 98/35212 | 8/1998 |
| WO | WO 00/42399 A1 | 7/2000 |
| WO | WO 01/84118 A2 | 11/2001 |
| WO | WO2005/015143 | 2/2005 |

OTHER PUBLICATIONS

European Search Report dated May 9, 2008.
European Office Action dated Mar. 28, 2011.
Japanese Office Action dated Sep. 13, 2011 with a partial English translation.

* cited by examiner

*Primary Examiner* — David Porta
*Assistant Examiner* — Yara Green
(74) *Attorney, Agent, or Firm* — McGinn Intellectual Property Law Group, PLLC

(57) ABSTRACT

To improve the precision of temperature compensation in an infrared sensor and obtain a sharp image, a correction is applied to a variation in output voltage (referred to as "background infrared radiation absorption intensity distribution" below) due to intensity distribution of background infrared radiation, which is light other than the incident infrared radiation on the infrared sensor, and the temperature characteristic of each individual bolometer constituting the infrared sensor. That is, the temperature of the infrared sensor is measured as a first temperature, a correction value for the output voltage of each bolometer is found by referring to a table, which indicates the background infrared radiation absorption intensity distribution versus the temperature of the infrared sensor, as well as the first temperature, and the variation in output voltage is corrected.

9 Claims, 22 Drawing Sheets

METHOD AND APPARATUS FOR COMPENSATING INFRARED SENSOR FOR TEMPERATURE

REFERENCE TO RELATED APPLICATION

The present application is claiming the priority of the earlier Japanese patent application No. 2007-019452 filed on Jan. 30, 2007, the entire disclosure thereof being incorporated herein by reference thereto.

FIELD OF THE INVENTION

This invention relates to a method and apparatus for compensating an infrared sensor for temperature. More particularly, the invention relates to a method and apparatus for temperature compensation of an uncooled infrared sensor that does not require an electronic cooling device (Peltier module).

BACKGROUND OF THE INVENTION

In an uncooled infrared image sensing device according to the related art, a sharp infrared image is obtained by exercising precise temperature control using an electronic cooling unit for the purpose of minimizing non-uniformity of a microbolometer array.

As an electronic cooler is costly (and complicated), system cost (and complexity) rises. Accordingly, a new technique is required in order to deal with the characteristics and non-uniformity of the microbolometer array over a broad range of temperatures.

The performance of a microbolometer array declines owing to a variation in response between individual microbolometer detectors responsive to an uniform incident infrared radiation.

Causes of such variation that can be mentioned include the infrared absorption coefficient, resistance, TCR (Temperature Coefficient of Resistance), thermal capacity and coefficient of heat-transfer of the individual detectors.

Since the scope of a variation in response caused by such non-uniformity can become greater than the magnitude of the actual response responsive to an incident infrared radiation, it is usually necessary to apply various techniques in order to compensate for non-uniformity and obtain a signal that corresponds to the incident infrared radiation.

In the usual microbolometer array, output voltage produced by each microbolometer varies greatly depending upon substrate temperature. There may also be cases where average output voltage in several microbolometers included in the array falls outside the range of minimum and maximum signals, as a result of which a satisfactory FPA (Focal Plane Array) performance within a desired range of operating temperatures is not obtained.

For example, as illustrated in FIG. 1, the output voltage of a microbolometer in a microbolometer may fall below the minimum dynamic range of the system before it reaches a maximum desired substrate temperature. Alternatively, as illustrated in FIG. 2, the output voltage of another microbolometer in the microbolometer array may rise above the maximum dynamic range of the system before it reaches the maximum desired substrate temperature (see Patent Document 2).

A method of temperature compensation for mitigating such non-uniform behavior in a desired temperature range has been disclosed. For example, in Patent Document 1, as opposed to two-point non-uniformity correction in the related art, the factor of substrate temperature is taken into consideration, bias voltage applied to the bolometer is adjusted in such a manner that the sensitivity of incident infrared radiation will be constant even if the substrate temperature changes, and a correction is applied that will result in a uniform output voltage characteristic.

FIG. 3 illustrates a simplified circuit for applying a temperature compensation, and FIG. 4 illustrates a signal flow for applying a temperature compensation (see Patent Document 1).

The temperature compensation process disclosed in Patent Document 1 is as follows:

(1) Sensor output is measured under a condition of two incidence levels and two substrate temperatures. Here note is taken of outputs from two pixels. The result is shown in FIG. 5A.

(2) Sensitivity responsive to the incident infrared radiation differs between two pixels at two substrate temperatures. Further, mean gain is calculated at each substrate temperature. The result is shown in FIG. 5B.

(3) The bias voltage of each pixel is adjusted in such a manner that the mean gains at each of the substrate temperatures will be equal. The result is shown in FIG. 5C.

(4) A conventional two-point correction, namely a gain correction and an offset correction responsive to incident infrared radiation, is carried out. The result is shown FIG. 5D.

FIG. 6 illustrates the result of the correction by the series of steps (1) to (4) above.

A spatially substantially uniform distribution is obtained between incidence levels Qmin, Qmax and substrate temperatures Tmin, Tmax.

FIG. 7 is a schematic view of an on-chip readout circuit. An action that will adjust bias voltage applied to a bolometer in such a manner that the sensitivity of incident infrared radiation will be rendered constant even if substrate temperature changes is implemented by a DAC 36, and a conventional offset correction with respect to incident infrared radiation is performed by a DAC 74.

FIG. 8 illustrates an example of a system configuration that includes a readout circuit.

Further, Patent Document 2 discloses a circuit in which relative mismatch between the temperature coefficient of resistance (TCR) of an active microbolometer 3 and that of a reference microbolometer 2 shown in FIG. 9 is compensated for by providing a variable resistor 26 in series with the active microbolometer 3. The variable resistor 26 can be calibrated over the desired temperature range to minimize the effects of the relative mismatch. In addition, the circuit of FIG. 9 also includes DAC (digital-analog converter) 40 and offset resistor 38.

For example, with reference to FIG. 9, in a case where the relative mismatch between the active microbolometer 3 and the reference microbolometer 2 is such that as substrate temperature rises, the resistance of the active microbolometer 3 decreases at a rate faster than the reference microbolometer 2, output voltage 42 will increase as the substrate temperature rises for a given level of incident infrared radiation. This is represented by curve 51 (FIG. 10) with respect to a minimum resistor value for resistor 26.

If, when measurements are repeated over the same substrate temperature range, the resistance value of variable resistor 26 shown in FIG. 9 is increased and the offset is adjusted so that the output voltage 42 is returned to the initial value for a minimum substrate temperature, then the output voltage 42 will increase at a lower rate relative to a rise in temperature. This is represented by curve 52. This process can be repeated for various values of the variable resistor 26, and curves 53 and 54, for example, are obtained. As is clear from curves 51 to 54, the curve 54 provides the best response over the desired substrate temperatures. Furthermore, this process can be used to obtain optimum resistor settings for each microbolometer in the array and obtain a characteristic of the kind shown in FIG. 11.

Further, the following is set forth in paragraph [0026] of Patent Document 3:

The influence of background radiation related to ambient temperature in the vicinity of a package housing a sensor is one factor that causes a change in the output voltage of the sensor. This influence contributes to an average (i.e., DC) component of signals from the sensor. Normally this influence essentially varies with time. This influence can be compensated for by an imaging system, for example, by subtracting it from the signals.

[Patent Document 1] WO 98/35212
[Patent Document 2] Japanese Patent Kohyo Publication No. JP-P2005-519266A
[Patent Document 3] Japanese Patent Kohyo Publication No. JP-P2003-532111A

SUMMARY OF THE DISCLOSURE

The following analysis is given by the present invention. The disclosures of the above-mentioned Patent Documents 1-3 are herein incorporated by reference thereto, and regarded as part of the disclosure of the present invention.

In an uncooled infrared image sensing device that does not require an electronic cooling unit (a Peltier module), the effect of substrate temperature (referred to as "sensor temperature" below) and the effect of background infrared radiation other than incident infrared radiation that has entered through a lens (referred to as "background infrared radiation" hereinafter) are considered as factors that cause an increase in variation in the output of a bolometer array, as set forth in the example of the related art.

However, even if temperature compensation that takes these effects into account is applied, this is not enough to suppress a variation in the output of the bolometer and obtain a sharp infrared image. The reason will be considered below.

FIG. 12 is a schematic view of incident infrared radiation and background infrared radiation. Here infrared light that emanates from the housing (body) in association with the temperature thereof is illustrated as an example of the background infrared radiation.

There are cases where the background infrared radiation that is dominant is not the background infrared radiation from the housing but the background infrared radiation from the sensor package, depending upon the structure of the sensor package or optical system. This is illustrated schematically in FIGS. 13A and 13B. In this case, it is necessary to monitor the package temperature and apply a correction that is based upon this temperature information.

In an uncooled infrared image sensing device that does not require a cooling unit (Peltier module), the pixel-by-pixel output voltage of the sensor varies with a change in the sensor temperature.

Sensor output voltage Vres that conforms to the incident infrared radiation is represented by the following equation:

$$Vres = (Vbol \cdot TCR@Ts \cdot \eta \cdot Pin)/Gth$$

where Vbol represents the applied voltage to the bolometer, TCR@Ts the temperature coefficient of the bolometer at a sensor temperature Ts (the coefficient corresponds to sensitivity, takes on a different value for every pixel and varies depending upon the sensor temperature), η the absorptivity of the bolometer, Pin the intensity of infrared radiation incident upon the bolometer, and Gth the thermal conductance of the bolometer.

Accordingly, even if the intensity of background infrared radiation is constant, the pixel-by-pixel output voltage varies owing to the fact that the temperature coefficient TCR of the bolometer has a different value for each pixel. That is, the background infrared radiation absorption intensity distribution also changes owing to a change in sensor temperature Ts. It is necessary, therefore, to correct the background infrared radiation absorption intensity distribution in accordance with the change in sensor temperature.

Further, since the background infrared radiation intensity distribution and incident infrared radiation intensity distribution differ at the surface of an infrared sensor, a problem is that a correction error arises in a case where only a correction of intensity distribution versus incident infrared radiation is performed, as in the related art. A challenge, therefore, is to perform a correction of intensity distribution independently with respect to the background infrared radiation as well.

Assume a case where an uncooled infrared image sensing device that does not require a cooling unit (Peltier module) is used as a radiation thermometer. In order to so arrange it that when only the background infrared radiation changes uniformly without a change in sensor temperature, an error will not be produced (in the indicated value of temperature) by regarding the change as a change in incident infrared radiation, the challenge is to correct not only the background infrared radiation absorption intensity distribution but also the absolute value of the amount of change in background infrared radiation.

Now, consider a case where the temperature of the housing changes as an example of a case where background infrared radiation changes.

In the case of an uncooled infrared image sensing device that does not require a cooling unit (Peltier module), sensor temperature and housing temperature are both decided by the temperature of the environment.

Specifically, although sensor temperature and housing temperature have a correlation with the temperature of the environment, a thermal time constant exists between sensor temperature and housing temperature because the device has thermal resistance and thermal capacity due to the physical structure of the interior of the image sensing device. For instance, a case where the temperature of the environment changes suddenly, as when the device enters the location of a fire while the device is imaging, can be mentioned as an example of a case where the temperature difference between sensor temperature and housing temperature becomes large.

A problem which arises, therefore, is that if sensor temperature and housing temperature are viewed as being the same, temperature compensation of an infrared sensor cannot be performed correctly.

Accordingly, it is a challenge (problem to be solved) is to deal with these two temperatures as temperatures that vary independently and correct for the influence of each.

According to a first aspect of the present invention, there is provided a method of compensating an infrared sensor for temperature. The method comprises: (a) correcting a variation in output voltage due to the temperature characteristic of each bolometer included in a bolometer array constituting an infrared sensor; (b) correcting a variation in output voltage due to intensity distribution of incident infrared radiation to be measured on the infrared sensor and the temperature characteristic of each bolometer; and (c) correcting a variation in output voltage (referred to as "background infrared radiation absorption intensity distribution" below) due to intensity distribution of background infrared radiation, which is light other than the incident infrared radiation on the infrared sensor, and the temperature characteristic of each bolometer.

According to a second aspect of the present invention, there is provided an apparatus for compensating an infrared sensor for temperature. The apparatus comprises: a table for correcting a variation in output voltage due to the temperature characteristic of each bolometer included in a bolometer array constituting an infrared sensor; a table for correcting a variation in output voltage due to intensity distribution of incident infrared radiation to be measured on the infrared sensor and a difference in the temperature characteristics of the respective bolometers; and a background infrared radiation absorption intensity distribution correcting unit that corrects a variation in output voltage (referred to as "background infrared radiation absorption intensity distribution" below) due to intensity distribution of background infrared radiation, which is light other than the incident infrared radiation on the infrared sensor, and a difference in the temperature characteristics of the respective bolometers.

In the following, preferred modes for carrying out the present invention are mentioned.

The (c) may include:

(d) measuring temperature of the infrared sensor as a first temperature; and (e) correcting a variation in output voltage by referring to a table, which indicates the background infrared radiation absorption intensity distribution versus the temperature of the infrared sensor, and the first temperature and finding a correction value of output voltage of each bolometer.

The method may further comprise (f) correcting a uniform voltage variation corresponding to intensity of background infrared radiation, which is light other than the incident infrared radiation on the infrared sensor.

The (f) may include:

(g) measuring temperature of a source of generation of the background infrared radiation as a second temperature; and (h) correcting a variation in output voltage by referring to a table, which indicates the intensity of the background infrared radiation versus the temperature of the source of generation of the background infrared radiation, and the second temperature, and finding a correction value of uniform output voltage.

In the apparatus according to the second aspect, the background infrared radiation absorption intensity distribution correcting unit may include:

a first table indicating the background infrared radiation absorption intensity distribution versus the temperature of the infrared sensor; and a first thermometer for measuring the temperature of the infrared sensor;

wherein a variation in output voltage is corrected by referring to the first temperature measured by the first thermometer and the first table, and finding a correction value of output voltage of each bolometer.

The apparatus may further comprise a background infrared radiation intensity correcting unit that corrects a uniform voltage variation corresponding to intensity of background infrared radiation, which is light other than the incident infrared radiation on the infrared sensor.

The background infrared radiation intensity correcting unit may include:

a second table indicating intensity of the background infrared radiation versus temperature of a source of generation of the background infrared radiation; and a second thermometer for measuring temperature of the source of generation of the background infrared radiation;

a variation in output voltage being corrected by referring to the second temperature measured by the second thermometer and the second table, and finding a correction value of uniform output voltage.

The meritorious effects of the present invention are summarized as follows.

Temperature compensation of an infrared sensor is performed by correcting a variation in output voltage (background infrared radiation absorption intensity distribution) due to intensity distribution of background infrared radiation, which is light other than the incident infrared radiation on the infrared sensor, and a difference in the temperature characteristics of the respective bolometers. This makes it possible to sense a sharp infrared image even if the temperature of the environment changes.

Other features and advantages of the present invention will be apparent from the following description taken in conjunction with the accompanying drawings, in which like reference characters designate the same or similar parts throughout the figures thereof.

PREFERRED MODES OF THE INVENTION

Figure 1:
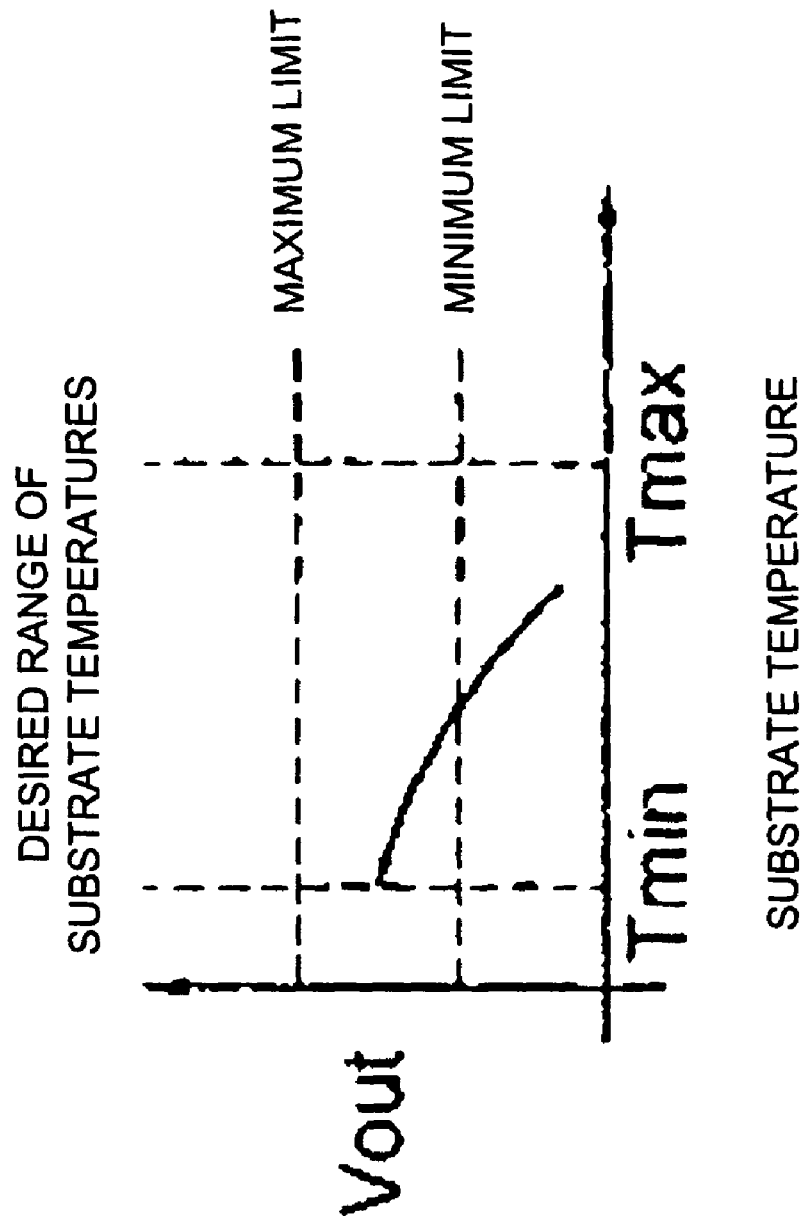
FIG. 1 is a graph illustrating the output voltage of a conventional microbolometer circuit as a function of substrate temperature.
Figure 2:
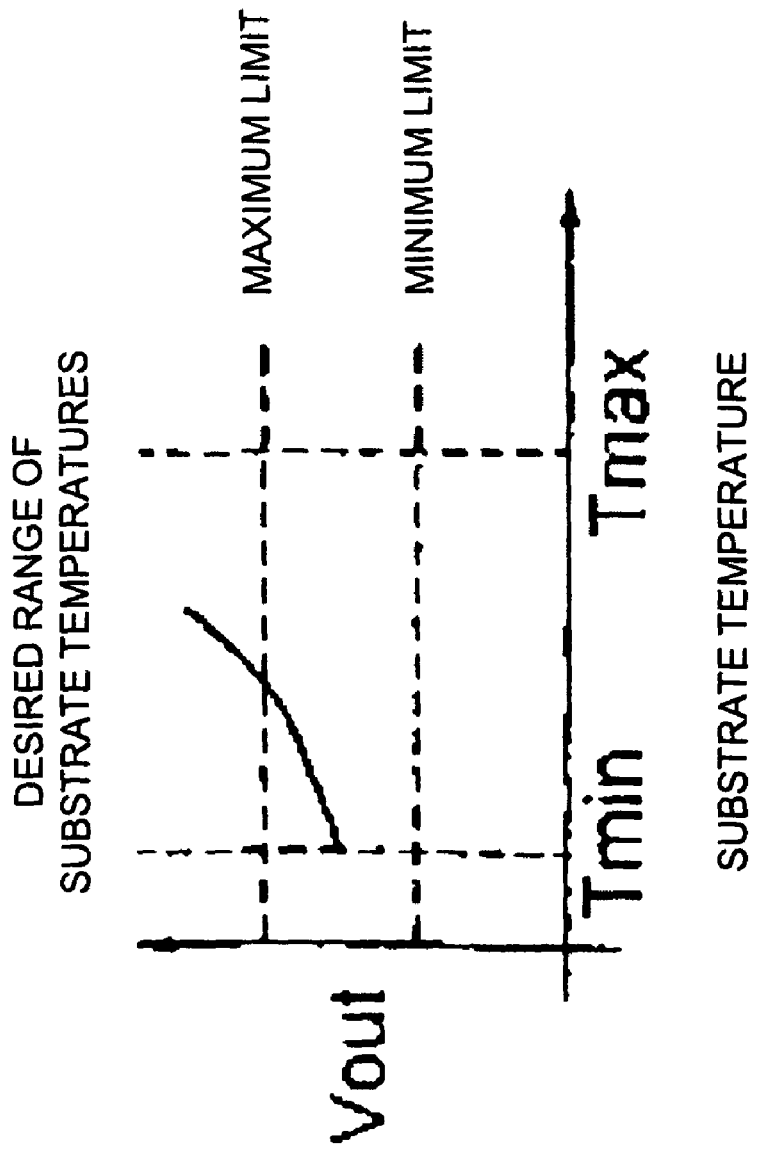
FIG. 2 is a graph illustrating the output voltage of another conventional microbolometer circuit as a function of substrate temperature.
Figure 3:
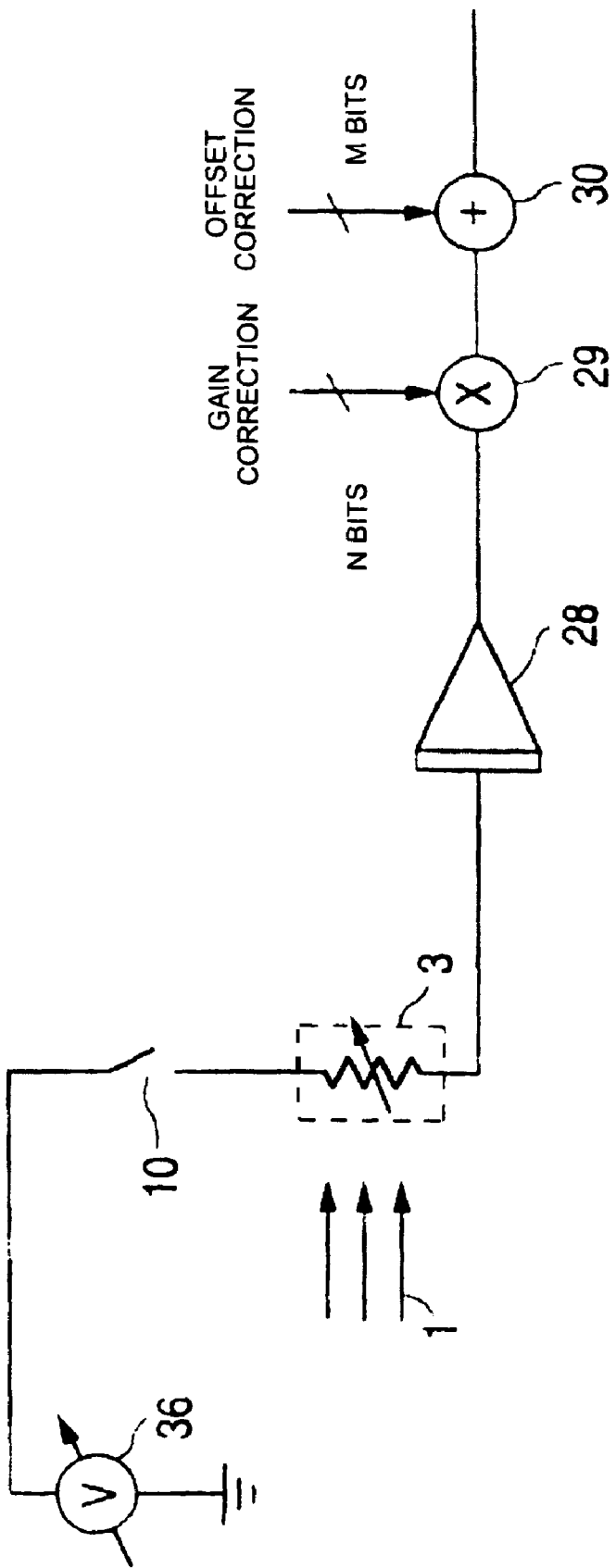
FIG. 3 shows a simplified circuit for performing temperature compensation based upon the related art.
Figure 4:
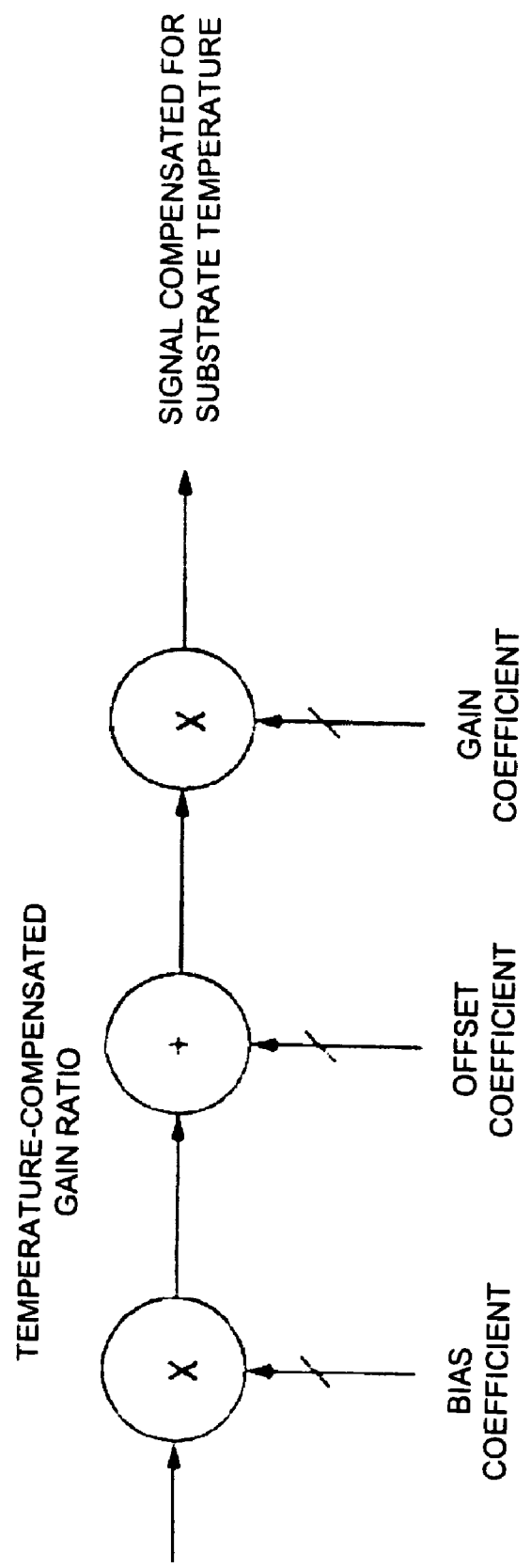
FIG. 4 illustrates a signal flow for performing temperature compensation based upon the related art.
Figure 5A:
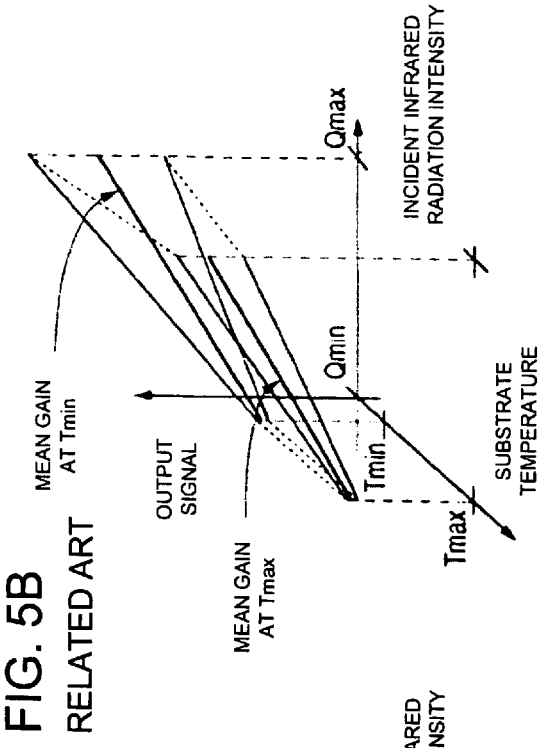
FIGS. 5A to 5D are graphs illustrating output voltages of microbolometer circuits that have implemented temperature compensation techniques based upon the related art.
Figure 5B:
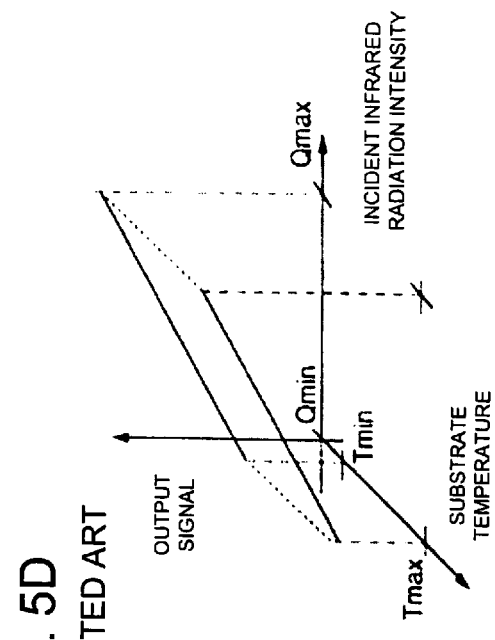
Figure 5C:
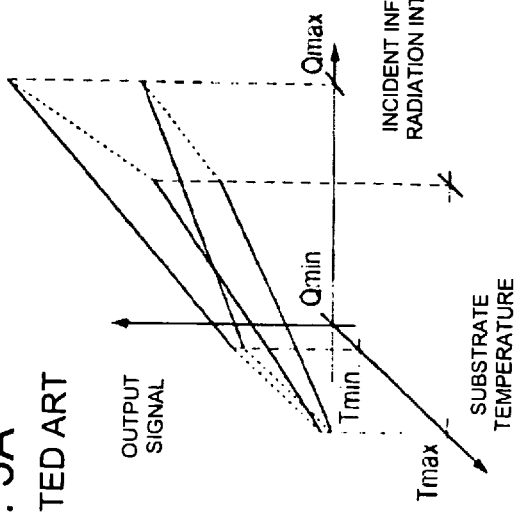
Figure 5D:
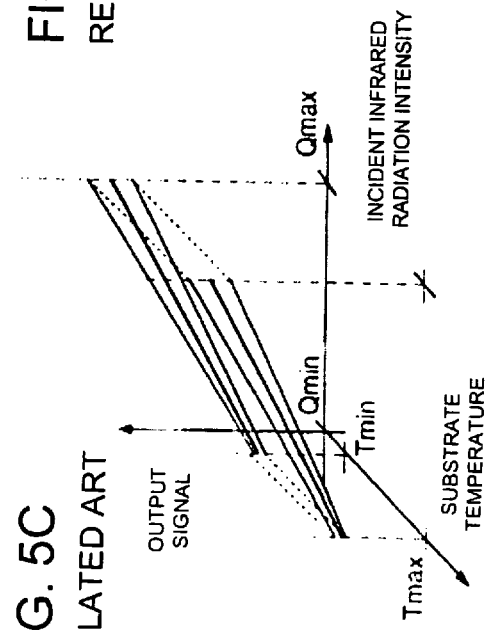
Figure 6:
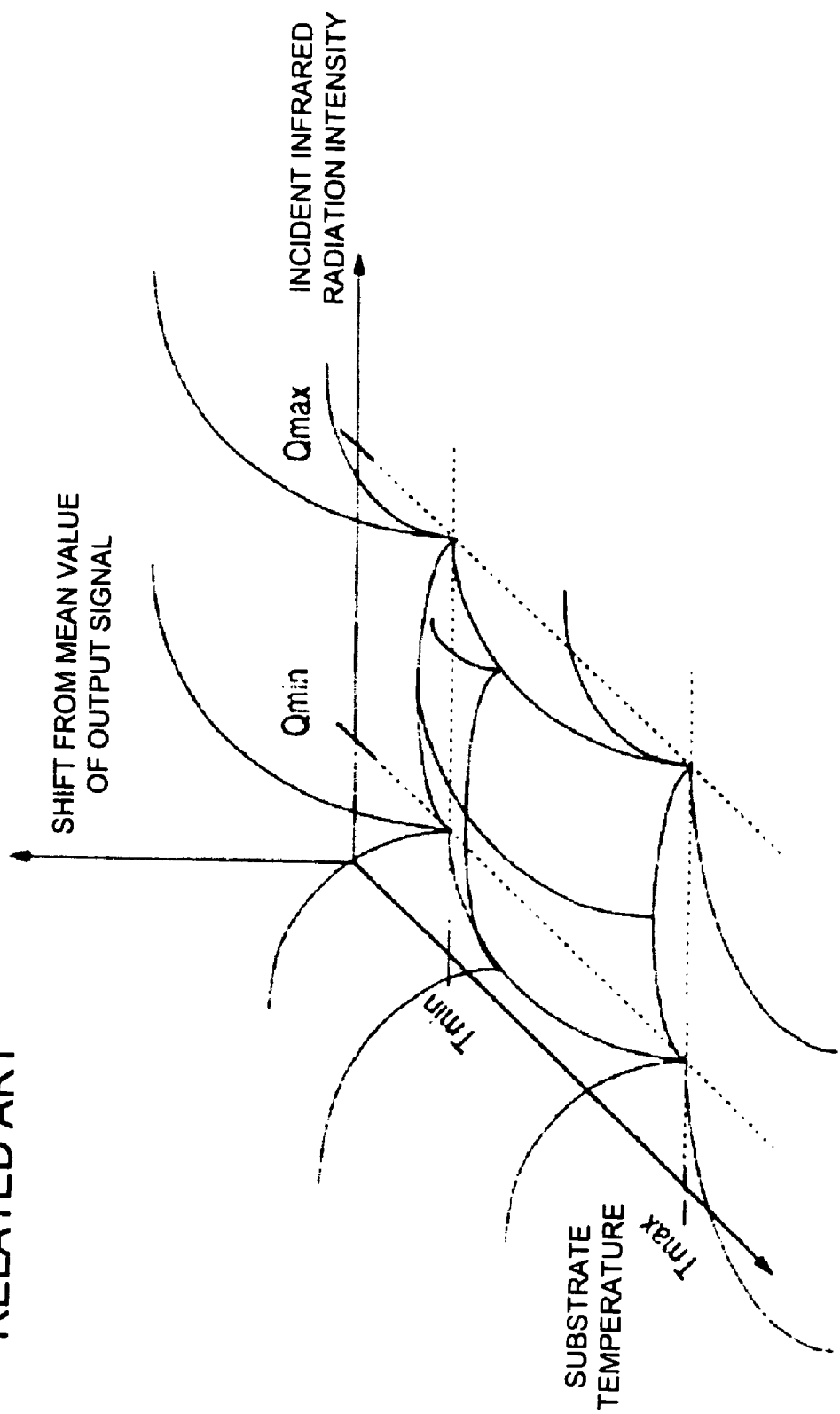
FIG. 6 is a graph illustrating spatial non-uniformity after execution of a temperature compensation technique based upon the related art.
Figure 7:
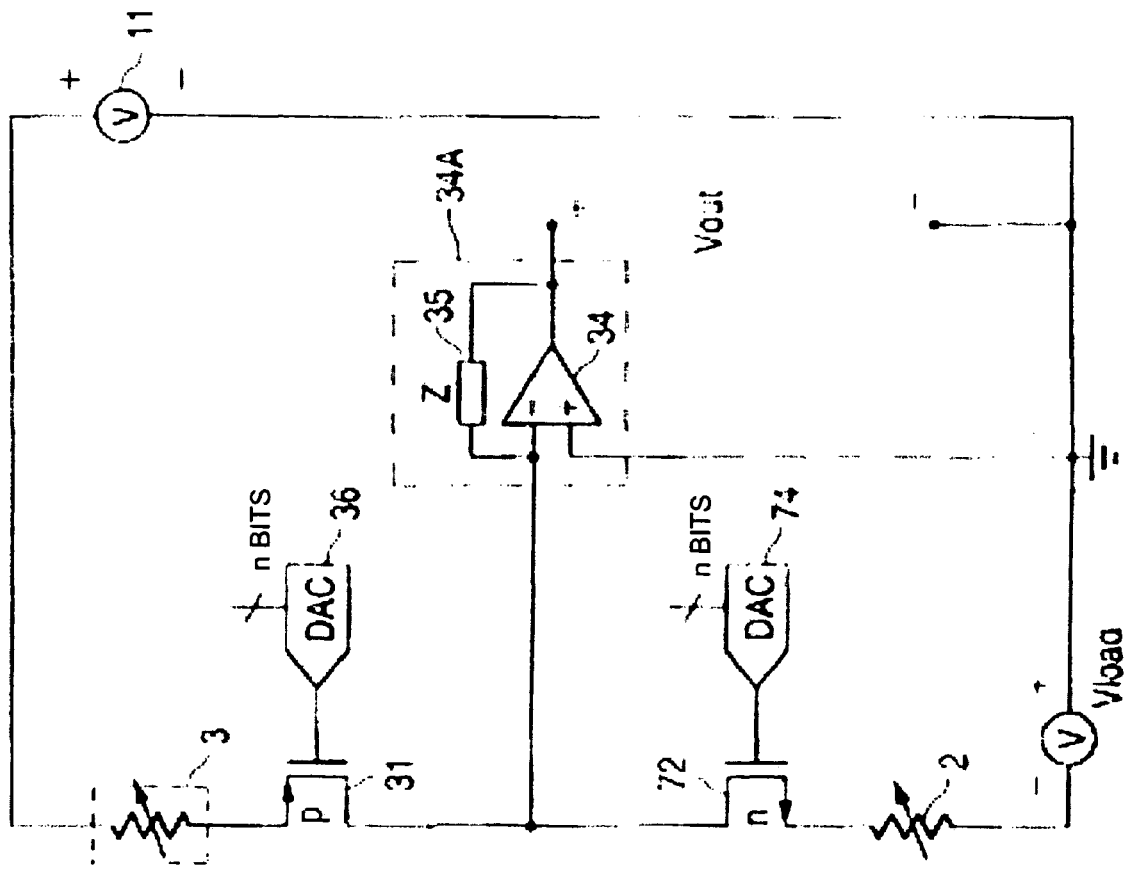
FIG. 7 is a schematic view of an on-chip readout circuit based upon the related art.
Figure 8:
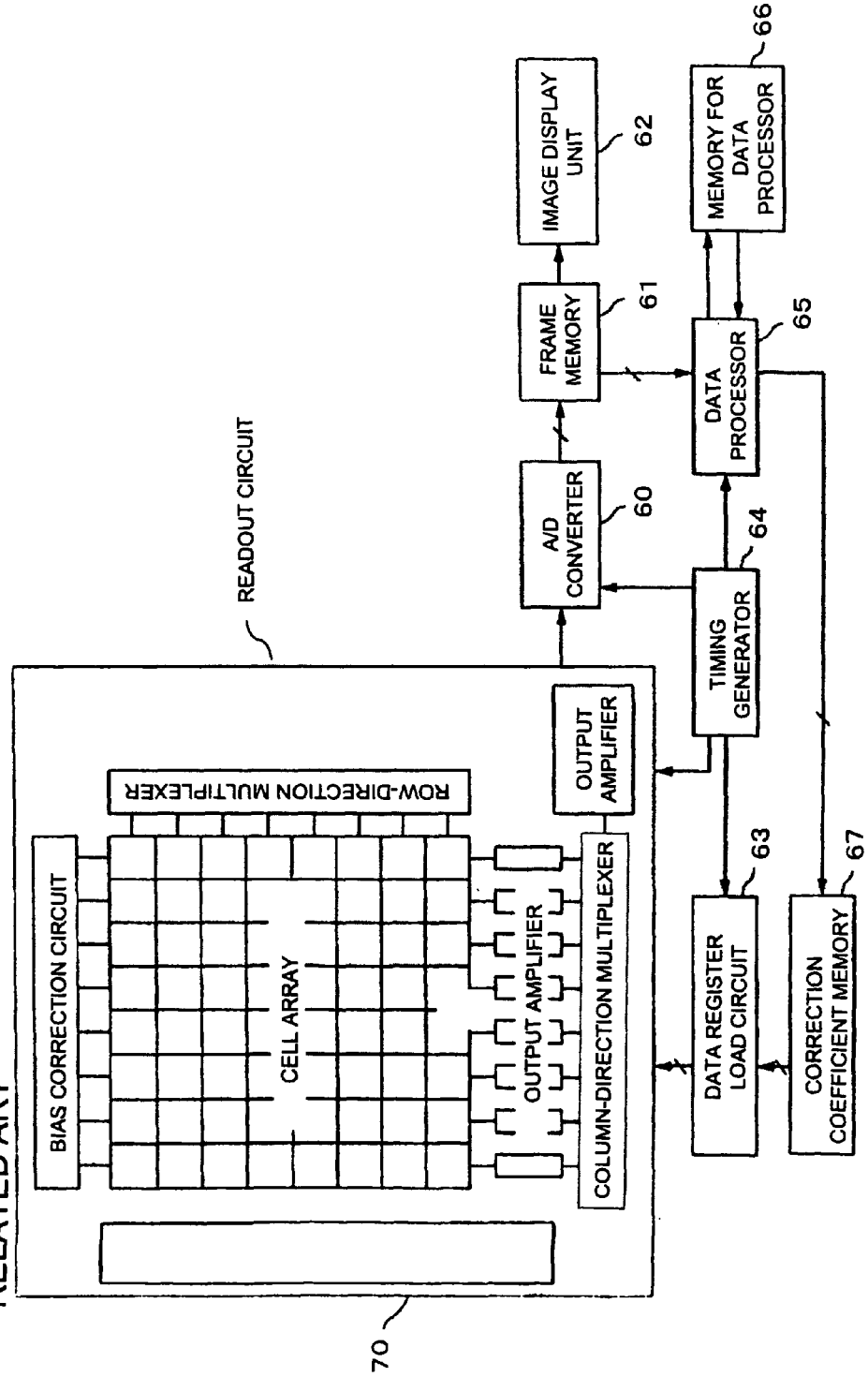
FIG. 8 illustrates an example of a system configuration that includes a readout circuit based upon the related art.
Figure 9:
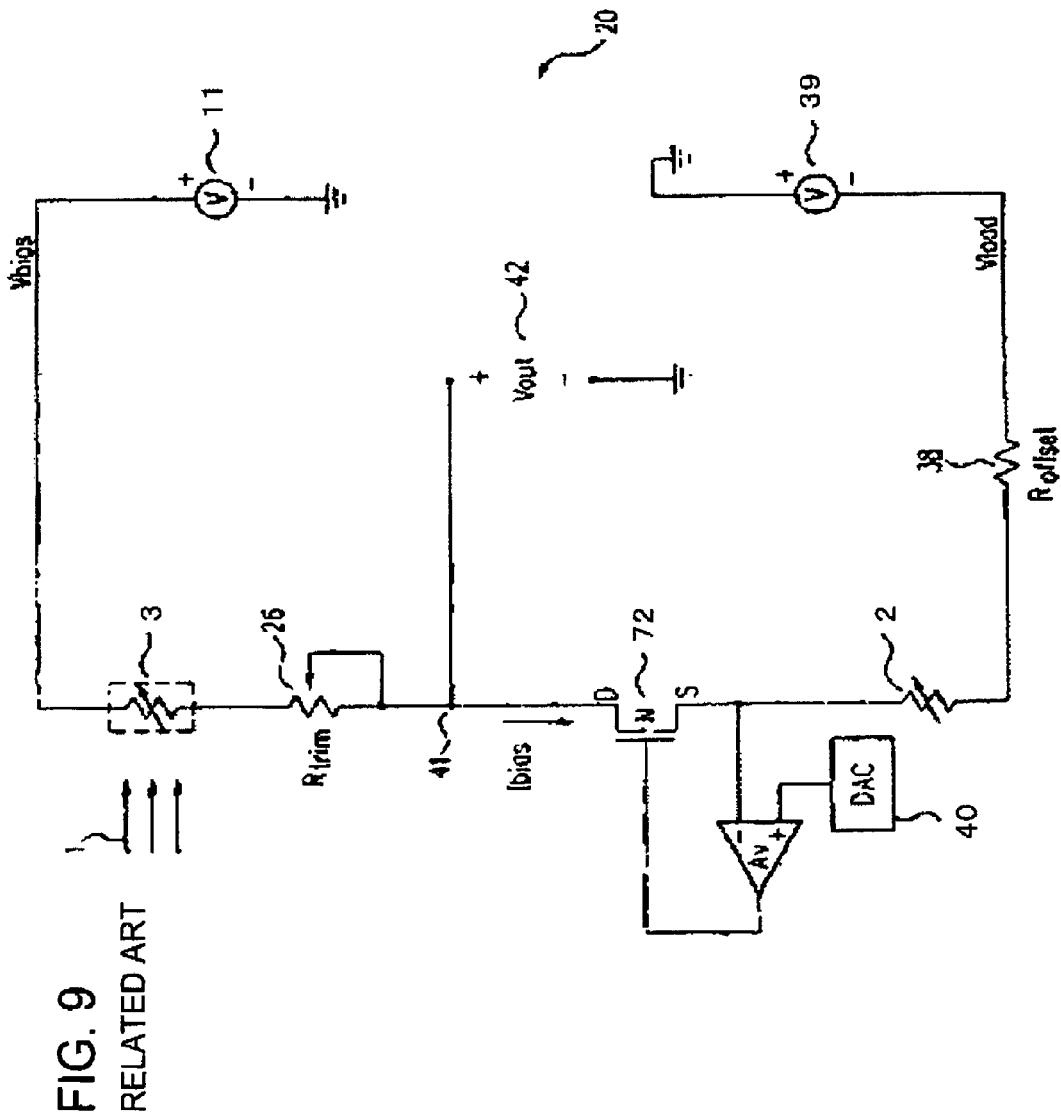
FIG. 9 illustrates a circuit for performing temperature compensation based upon the related art.
Figure 10:
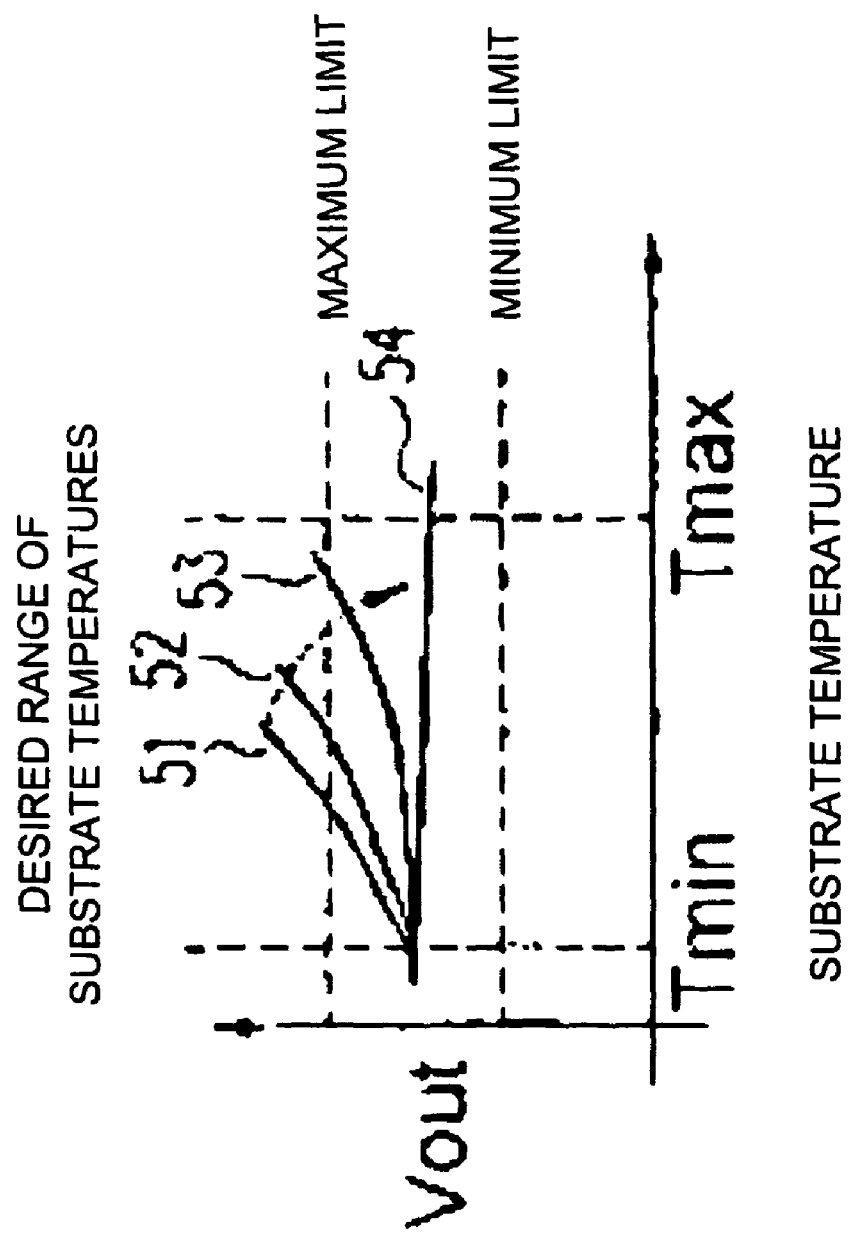
FIG. 10 is a graph illustrating the output voltage of a conventional microbolometer circuit as a function of substrate temperature, the graph exemplifying a temperature compensation technique based upon an example.
Figure 11:
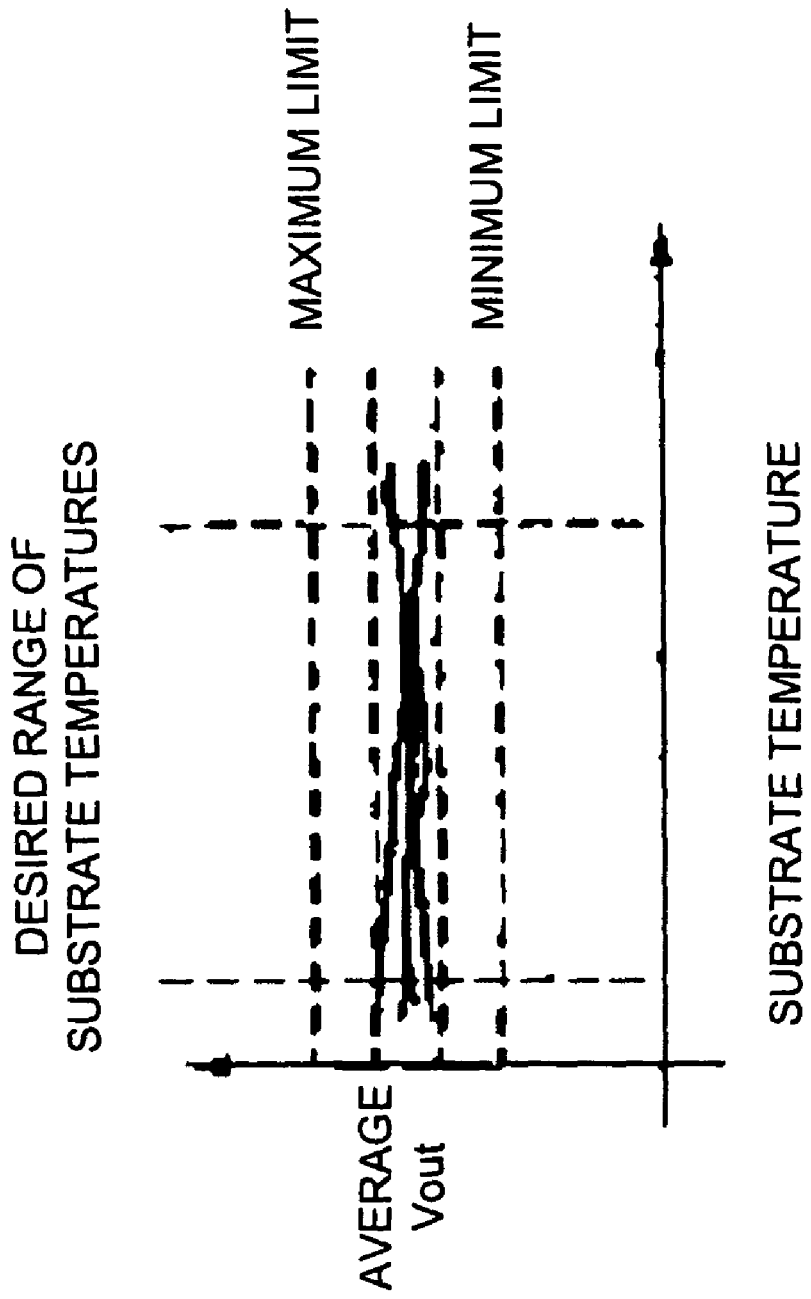
FIG. 11 is a graph illustrating the output voltage of a microbolometer circuit from a microbolometer array after execution of a temperature compensation technique based upon the related art.
Figure 12:
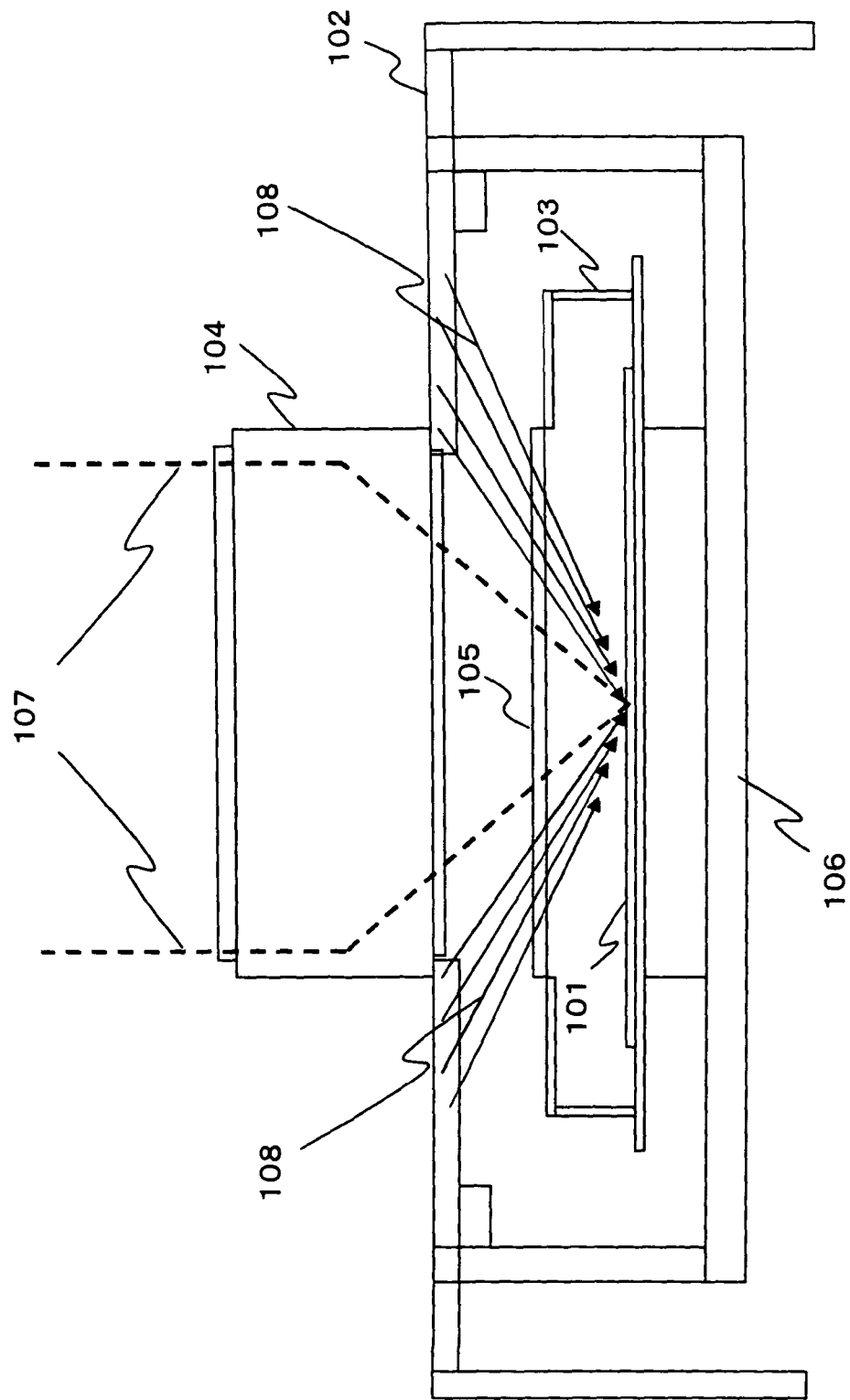
FIG. 12 is a schematic view illustrating optical components of an infrared image sensing device.
Figure 13A:
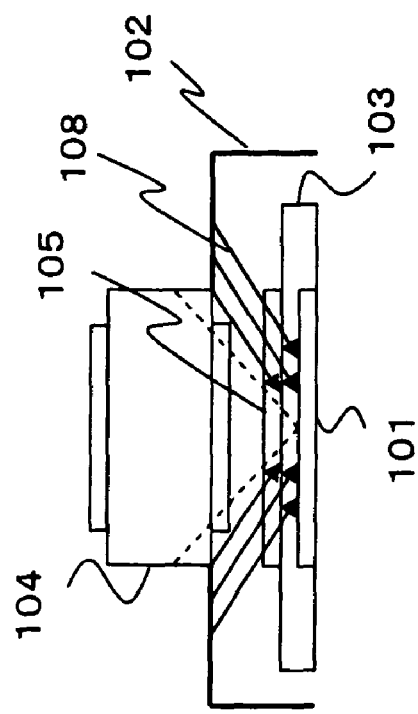
FIGS. 13A and 13B are schematic views representing two examples regarding optical components of an infrared image sensing device.
Figure 13B:
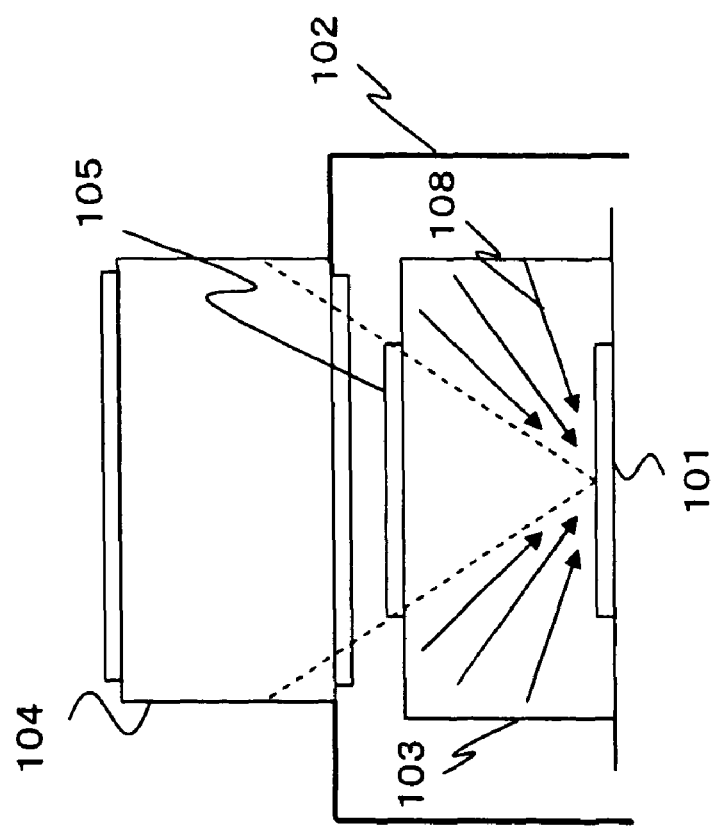
Figure 14:
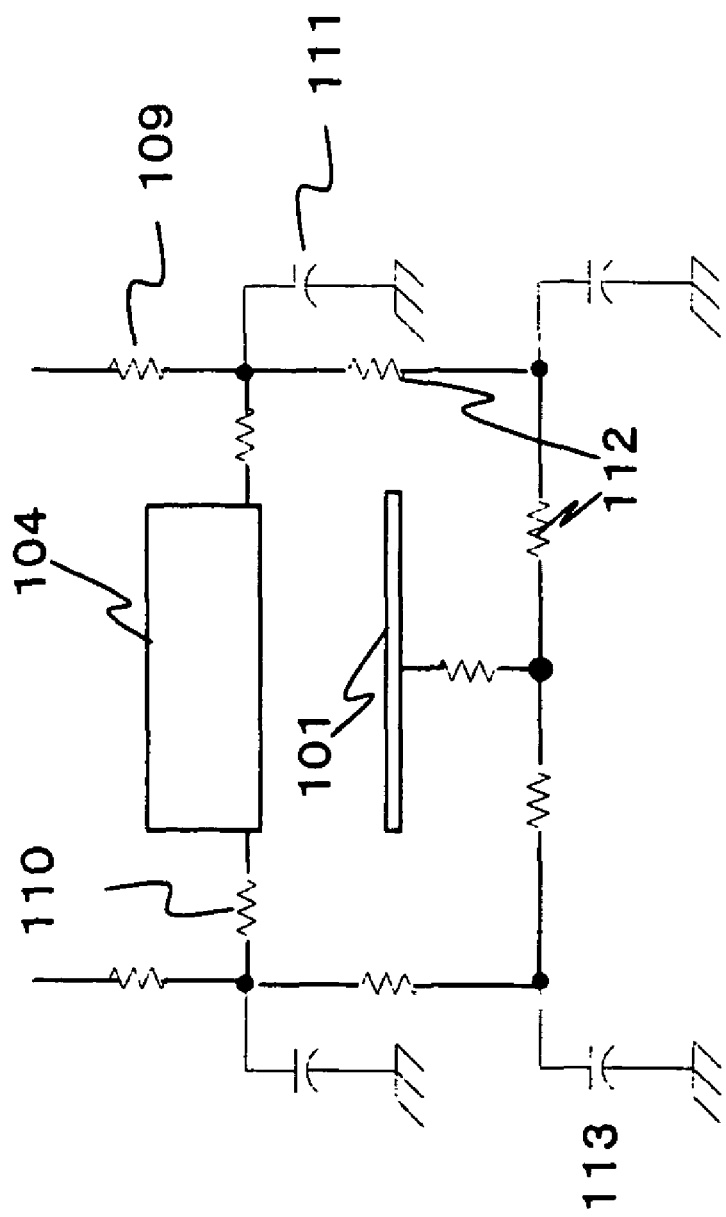
FIG. 14 is a schematic view representing thermal components of an infrared image sensing device.

In order to obtain a sharp infrared image according to the present invention, the invention (1) performs a sensitivity correction conforming to a change in output voltage with respect to a change in sensor temperature; (2) performs a correction of background infrared radiation absorption intensity distribution; and (3) performs a correction of the absolute value of amount of change in background infrared radiation.

A method of compensating an infrared sensor for temperature according to the present invention is a method of compensating the infrared sensor for a change in at least one operational characteristic of the sensor due to temperature variation of the infrared sensor, the method including a step of dynamically adjusting at least one calibration parameter associated with the sensor based upon the temperature variation of the infrared sensor. A particular characterizing feature of the method is that a background infrared radiation absorption intensity distribution is calibrated in accordance with a change in sensor temperature.

An apparatus for compensating an infrared sensor for temperature according to the present invention includes a signal processor for compensating the infrared sensor for a change in at least one operational characteristic of the sensor due to temperature variation of the infrared sensor, wherein the signal processor dynamically adjusts at least one calibration parameter associated with the sensor based upon the temperature variation of the infrared sensor. A particular characterizing feature of the apparatus resides in that a background infrared radiation absorption intensity distribution is calibrated in accordance with a change in sensor temperature.

Further, an apparatus for compensating an infrared sensor for temperature according to the present invention includes a first correction table indicating correspondence among temperature of an infrared sensor obtained by a first thermometer, sensitivity of the infrared sensor and intensity distribution of background infrared radiation (namely light other than the directly incident infrared radiation). Preferably, processing for correcting an output signal obtained from the infrared sensor is executed using a correction value obtained from the first correction table based upon temperature information from the first thermometer.

Further, an apparatus for compensating an infrared sensor for temperature according to the present invention includes a second correction table indicating correspondence between the temperature of a portion, which is obtained by a second thermometer, that emits background infrared radiation (namely light other than the directly incident infrared radiation) that impinges upon the infrared sensor from the interior of an infrared image sensing device and an output signal from the infrared sensor conforming to the intensity of the background infrared radiation (namely light other than the directly incident infrared radiation). Processing for correcting an output signal obtained from the infrared sensor may be executed using a correction value obtained from the second correction table based upon temperature information from the second thermometer.

An example of a method and apparatus for compensating an infrared sensor for temperature according to the present invention will now be described in detail with reference to the drawings.

Figure 15:
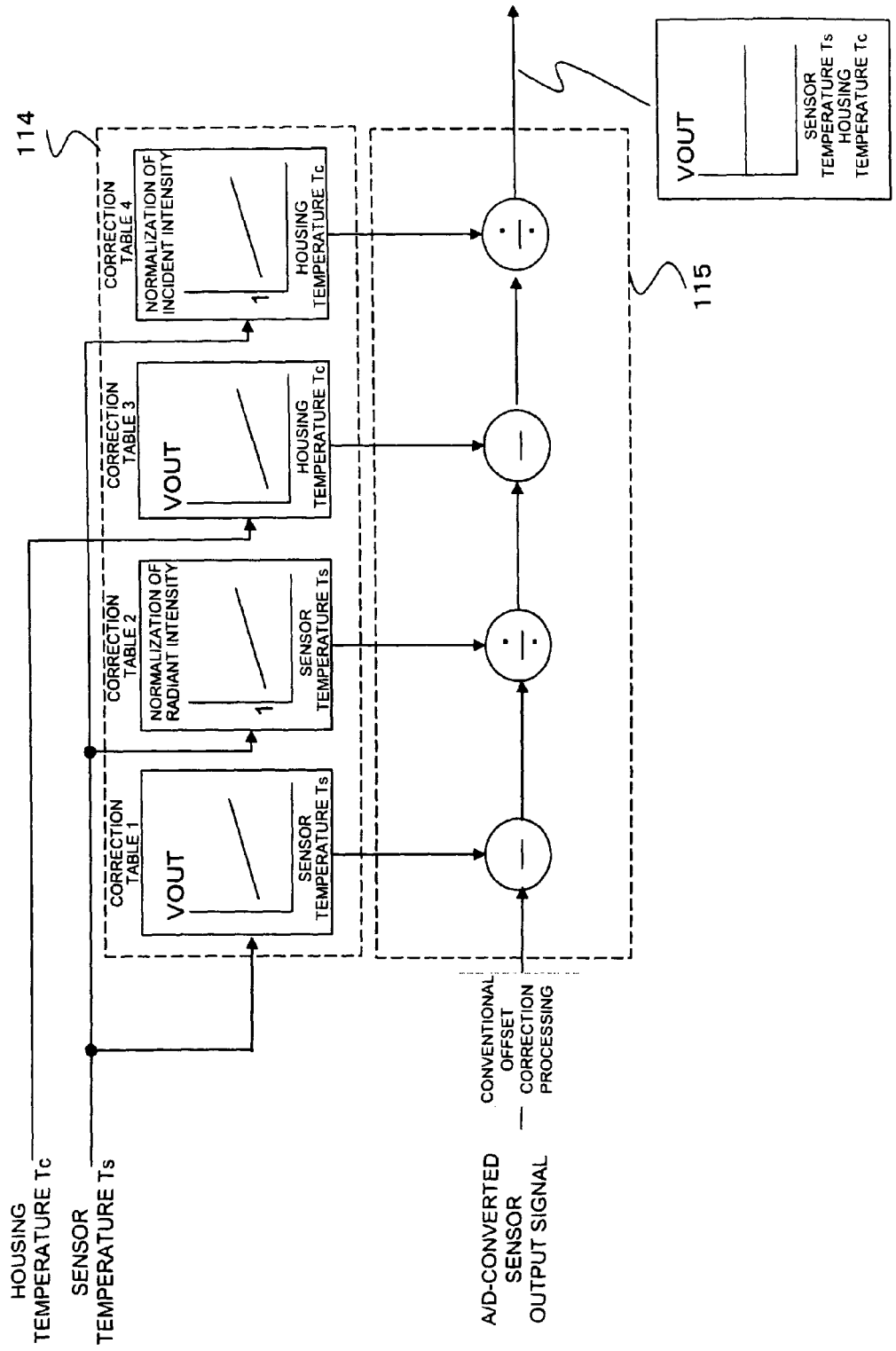
FIG. 15 is a schematic view of a correction block (which constitutes a signal processing system) illustrating an example of the present invention.

FIG. 15 is a schematic view of a correction block or unit (which constitutes a signal processing system) illustrating an example of the present invention.

First, a breakdown of the factors that cause a variation in the output signal of an uncooled infrared sensor that does not require an electronic cooling unit (e.g., a Peltier module) can be expressed by the following equation:

output signal variation=component due to sensor temperature variation+component due to radiant light variation+component due to incident infrared
    radiation variation The component due to variation in sensor temperature includes the temperature drift component of an on-chip read-out circuit besides a component ascribable to a bolometer temperature characteristic conforming to the change in sensor temperature.

The component due to variation in background infrared radiation is a change in the background infrared radiation absorption intensity distribution ascribable to a change in sensitivity due to a change in sensor temperature and a change in housing temperature conforming to a change in the temperature of the environment.

The component due to variation in incident infrared radiation variation naturally includes a change in incident infrared radiation ascribable to a change in the temperature of the subject imaged, as well as a change in lens transmittance ascribable to a change in the temperature of the environment.

In order to correct these variation components and suppress a variation in the output signal at the time of imaging, it is necessary to prepare the following tables in advance:

Correction Table 1: this table corrects a component (inclusive of in-surface distribution) due to the temperature characteristic of the bolometer ascribable to a change in sensor temperature, as well as temperature drift of the on-chip read-out circuit;

Correction Table 2: this table performs a sensitivity correction of background infrared radiation and a correction of intensity distribution of background infrared radiation, conforming to a change in output voltage versus a change in sensor temperature.

Correction Table 3: this table performs a correction of a change component (absolute value) of background infrared radiation ascribable to a change in housing temperature.

Correction Table 4: this table performs a sensitivity correction of incident infrared radiation and a correction of intensity distribution of incident infrared radiation (the influence of lens shading and a change in lens transmittance, etc.) conforming to a change in output voltage versus a change in sensor temperature.

If Correction Table 4 is inserted after Correction Table 2, then Correction Table 4 will include the ratio between the intensity distributions of incident infrared radiation and background infrared radiation.

Figure 16:
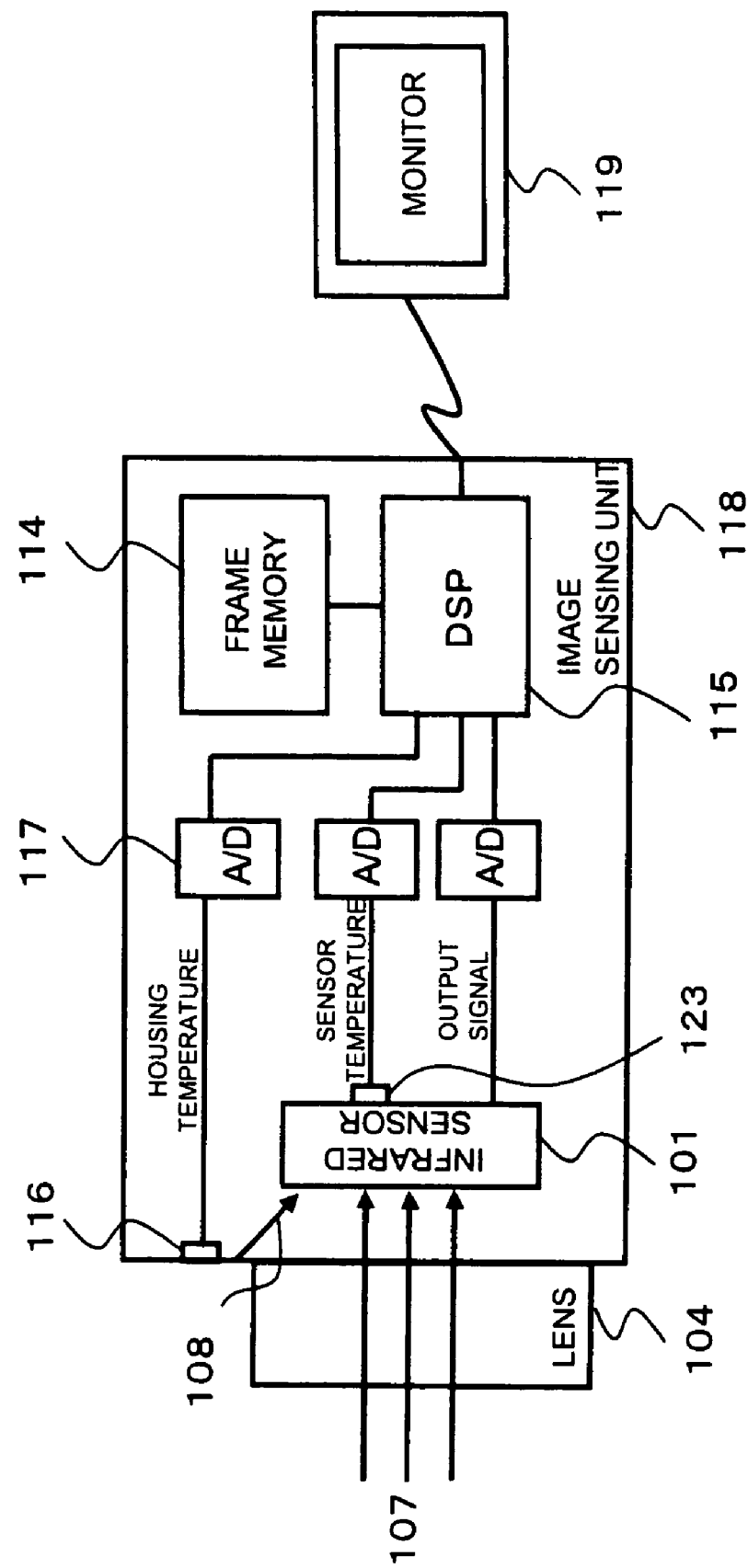
FIG. 16 illustrates the configuration of an image sensing unit having an apparatus for compensating an infrared sensor for temperature according to an example of the present invention.

FIG. 16 illustrates the configuration of an image sensing unit having an apparatus for compensating an infrared sensor for temperature according to an example of the present invention.

Incident infrared radiation 107 to be measured reaches an infrared sensor 101 via a lens 104. In addition to the incident infrared radiation 107, background infrared radiation 108 reaches the infrared sensor 101 from, e.g., the housing of the image sensing unit. In order to compensate the infrared sensor 101 for temperature, the temperature of the infrared sensor 101 and the temperature of the housing are measured by thermometers 123 and 116, respectively. Together with the output signal from the infrared sensor 101, signals representing these temperatures are sent to a DSP (Digital Signal Processor) 115 via an A/D converter 117.

The output signal of the infrared sensor 101 is corrected in the DSP 115 based upon Correction Tables 1 to 4 stored in a frame memory 114 and the above-mentioned signals that have been transmitted to the DSP 115.

It is preferred that the Correction Tables 1 to 4 be created in advance, for calibration.

Figure 17:
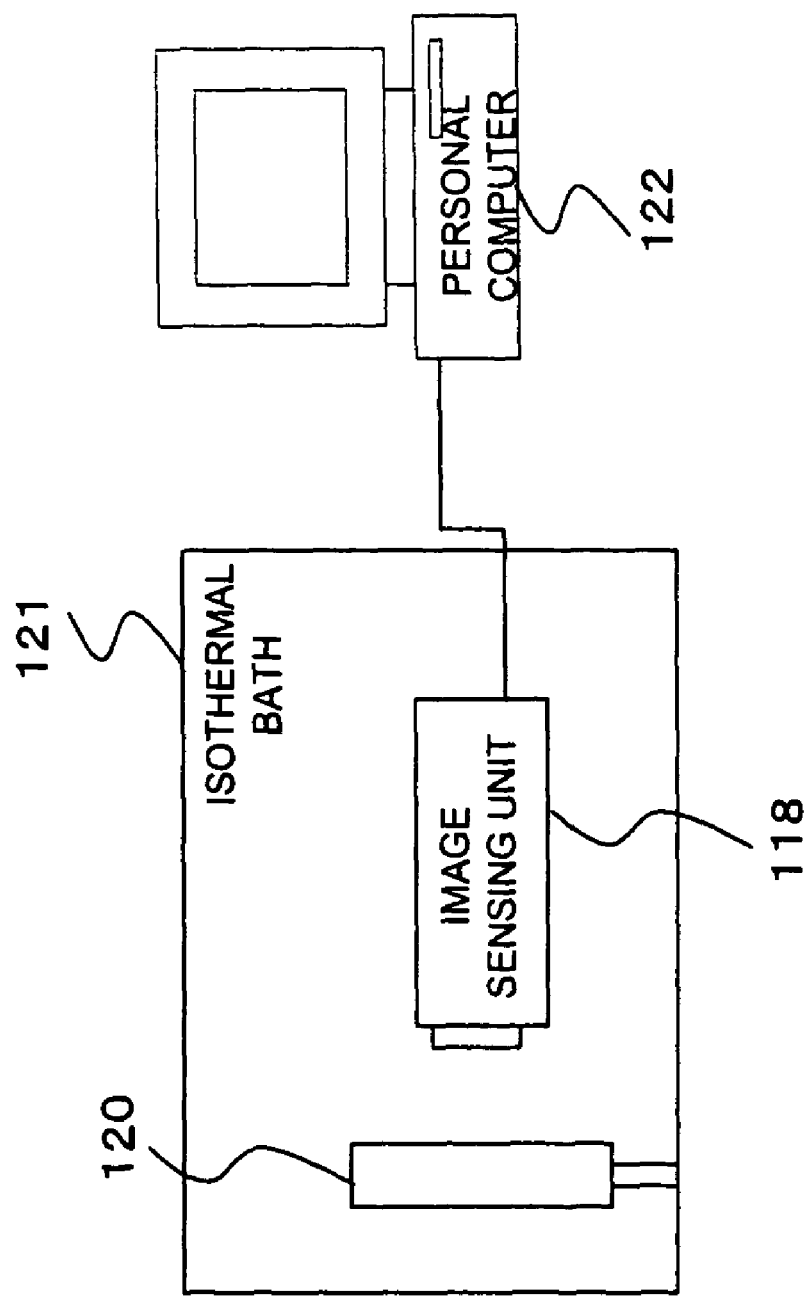
FIG. 17 illustrates an example of a setup for performing data acquisition according to the present invention.

A conceivable method of accomplishing this by way of example is to place an image sensing unit 118 in an isothermal bath 121, vary the temperature and acquire data, as illustrated in FIG. 17.

FIG. 17 illustrates an example of a setup for performing data acquisition. Computation may be performed utilizing a DSP (DSP 115 in FIG. 16) within the image sensing unit 118 without the intervention of a personal computer 122, as illustrated in FIG. 17. Further, a flat light source 120 may be placed outside the isothermal bath 121.

The correction coefficients to be stored in the Correction Tables 1 to 4 will be described in detail taking output voltages from two pixels as an example.

Let V1 and V2 represent the output voltages of two pixels (pixels 1 and 2, respectively). The output voltages V1 and V2 can be expressed as follows in correspondence with three terms on the right side of the above-mentioned variation in output voltage:

$$V1=\{(B1 \cdot Ts)+[Kb1 \cdot (1+A1) \cdot C \cdot Tc)]+[Ki1 \cdot (1+A1) \cdot Pin]\} \cdot V$$

$$V2=\{(B2 \cdot Ts)+[Kb2 \cdot (1+A2) \cdot C \cdot Tc)]+[Ki2 \cdot (1+A2) \cdot Pin]\} \cdot V$$

where Ts is sensor temperature, Tc is housing temperature, B1(B2) is a coefficient of change in output voltage versus sensor temperature variation of pixel 1 (pixel 2), Kb1 (Kb2) is a coefficient corresponding to the intensity distribution of background infrared radiation of pixel 1 (pixel 2), A1 (A2) is a temperature coefficient of a bolometer of pixel 1 (pixel 2), C is a coefficient of intensity of background infrared radiation, Ki1 (Ki2) is a coefficient corresponding to intensity distribution of incident infrared radiation of pixel 1 (pixel 2), Pin is a coefficient corresponding to incident signal intensity from the subject, and V is a reference output voltage.

Correction Table 1 includes the coefficients of the first term on the right side of V1 and V2, Correction Tables 2 and 3 include the coefficient of the second term on the right side, and Correction Table 4 includes the coefficients of the second and third terms on the right side.

Illustrated here will be a case where a correction that brings the characteristic of pixel 2 into conformity with the characteristic of pixel 1 will be illustrated, with pixel 1 serving as a reference pixel.

In this case, the coefficients included in Correction Tables 1 to 4 of pixels 1 and 2 are given by the following expressions:

Correction Table 1 of pixel 1: $B1 \cdot V$

Correction Table 2 of pixel 1:1

Correction Table 3 of pixel 1: $Kb1 \cdot (1+A1) \cdot C \cdot V$

Correction Table 4 of pixel 1: $(1+A1)$

Correction Table 1 of pixel 2: $B2 \cdot V$

Correction Table 2 of pixel 2: $[Kb2 \cdot (1+A2)]/[Kb1 \cdot (1+A1)]$

Correction Table 3 of pixel 2: $Kb1 \cdot (1+A1) \cdot C \cdot V$

Correction Table 4 of pixel 2: $[(Ki2/Kb2)/(Ki1/Kb1)] \cdot (1+A1)$

These correction coefficients are provided in the correction tables. When imaging is performed, a correction value is calculated based upon Correction Table 1 and the measured sensor temperature Ts, and the correction value is subtracted from the sensor output signal.

Next, a correction factor is calculated based upon Correction Table 2 and the measured sensor temperature Ts, and the sensor output signal is divided by this correction factor.

Furthermore, a correction value is calculated based upon Correction Table 3 and the measured housing temperature Tc is subtracted from the sensor output signal.

Finally, a correction factor is calculated based upon Correction Table 4 and the measured temperature sensor Ts, and the sensor output signal is divided by this correction factor.

The output voltages V1, V2 corresponding to the two pixels can be expressed as follows by the above-described correction processing:

$$V1=(Ki1 \cdot Pin) \cdot V$$

$$V2=(Ki1 \cdot Pin) \cdot V$$

It will be understood from these Equations that by executing this correction processing, the variation component of sensor temperature Ts and the variation component of housing temperature Tc become zero and a sharp infrared image comprising only the incidence signal component from the imaged subject is obtained.

Since the sensor output voltage includes the component due to the variation in sensor temperature, the component due to the variation in background infrared radiation and the component due to the variation incident infrared radiation, as mentioned above, it is required that these components be isolated quantitatively and that correction coefficients be created.

First, the component due to the variation in incident infrared radiation can be isolated by imaging a flat light source that has a constant temperature and acquiring the resultant data.

Next, a conceivable method of isolating the component due to the variation in sensor temperature (the characteristic of a change in sensor output versus sensor temperature) and the component due to the variation in background infrared radiation (the characteristic of a change in sensor output versus housing temperature) is to acquire data under two conditions, namely under atmospheric pressure and vacuum, for the environment internal of the package in which the infrared sensor has been mounted. This method will be described in detail below.

In order to detect a slight change in the heat of the subject (to be imaged) by absorbing infrared radiation emitted from the subject, the infrared sensor has a structure in which it is thermally isolated from the silicon substrate, the infrared sensor is mounted in the package in such a manner that a change in the heat will not be thermally dissipated by the air, and then the package is vacuum-sealed.

Accordingly, operating the sensor with the environment inside the package open to the atmosphere means the sensor will have no sensitivity to infrared radiation incident upon the sensor since a slight change in heat due to the incident infrared radiation will be dissipated via the air. The component due to the variation in sensor temperature and the component due to the variation in background infrared radiation can be isolated, therefore, by utilizing this characteristic.

The specific flow of the operation is as follows: Before the package is vacuum-sealed in the process of manufacturing the sensor, the sensor is temporarily assembled in the image sensing unit and data acquisition for creating a correction table is performed. After a series of the required data is acquired, the package is vacuum-sealed. This is followed by the creation of a correction table relating to incident infrared radiation and a correction table relating to background infrared radiation.

However, since the sensor is loaded and unloaded during the process of sensor manufacture, the above method of acquiring data under the two conditions of atmosphere and vacuum for the environment within the package is a method that cannot be implemented by the camera manufacturer that purchases the sensor package and fabricates the image sensing unit.

Accordingly, a method of acquiring data with the package in the vacuum-sealed state has been proposed according to the present invention.

In the case of an uncooled infrared image sensing device that does not require a cooling unit (Peltier module), however, it is not possible to hold sensor temperature fixed and vary housing temperature, and vice versa. If the temperature of the isothermal bath (the temperature of the environment) is varied, a problem that arises is that both sensor temperature and housing temperature will change.

In order to solve this problem, use is made of the fact that a thermal time constant exists between the sensor temperature and the housing temperature. Specifically, when data is acquired by varying the temperature of an isothermal bath, the temperature of the isothermal bath is varied in steps from a temperature A to a temperature B, and a temperature difference is produced owing to the thermal time constant between the sensor temperature and the housing temperature.

Further, by implementing this stepwise change in temperature twice, namely in a case where the temperature is elevated from temperature A to temperature B and a case where the temperature is lowered from temperature B to temperature A, two states, namely a housing temperature $Tc1s1$ and a housing temperature $Tc2s1$, can be produced with respect to a certain sensor temperature $Ts1$ (and two states, namely a housing temperature $Tc1s2$ and a housing temperature $Tc2s2$, can be produced with respect to one more sensor temperature $Ts2$), and two states, namely a sensor temperature $Ts1c1$ and a sensor temperature $Ts2c1$, can be produced with respect to a certain housing temperature $Tc1$, and it is possible to isolate and find from the data the characteristic of the change in sensor output versus sensor temperature and the characteristic of the change in sensor output versus housing temperature.

Figure 18:
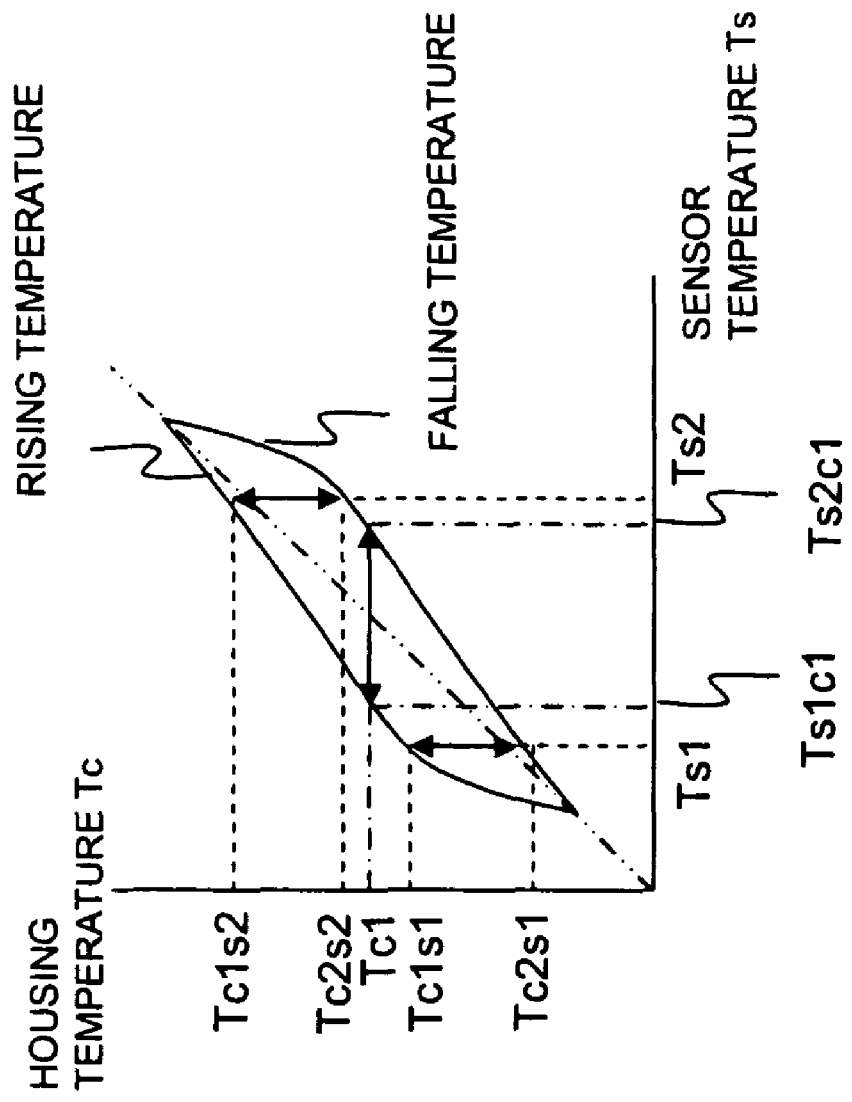
FIG. 18 is a schematic view of housing temperature versus sensor temperature according to the present invention.

FIG. 18 schematically illustrates the housing temperature versus sensor temperature obtained from the above-described stepwise change in temperature of the isothermal bath.

A method of creating correction tables is illustrated below in detail.

Figure 19:
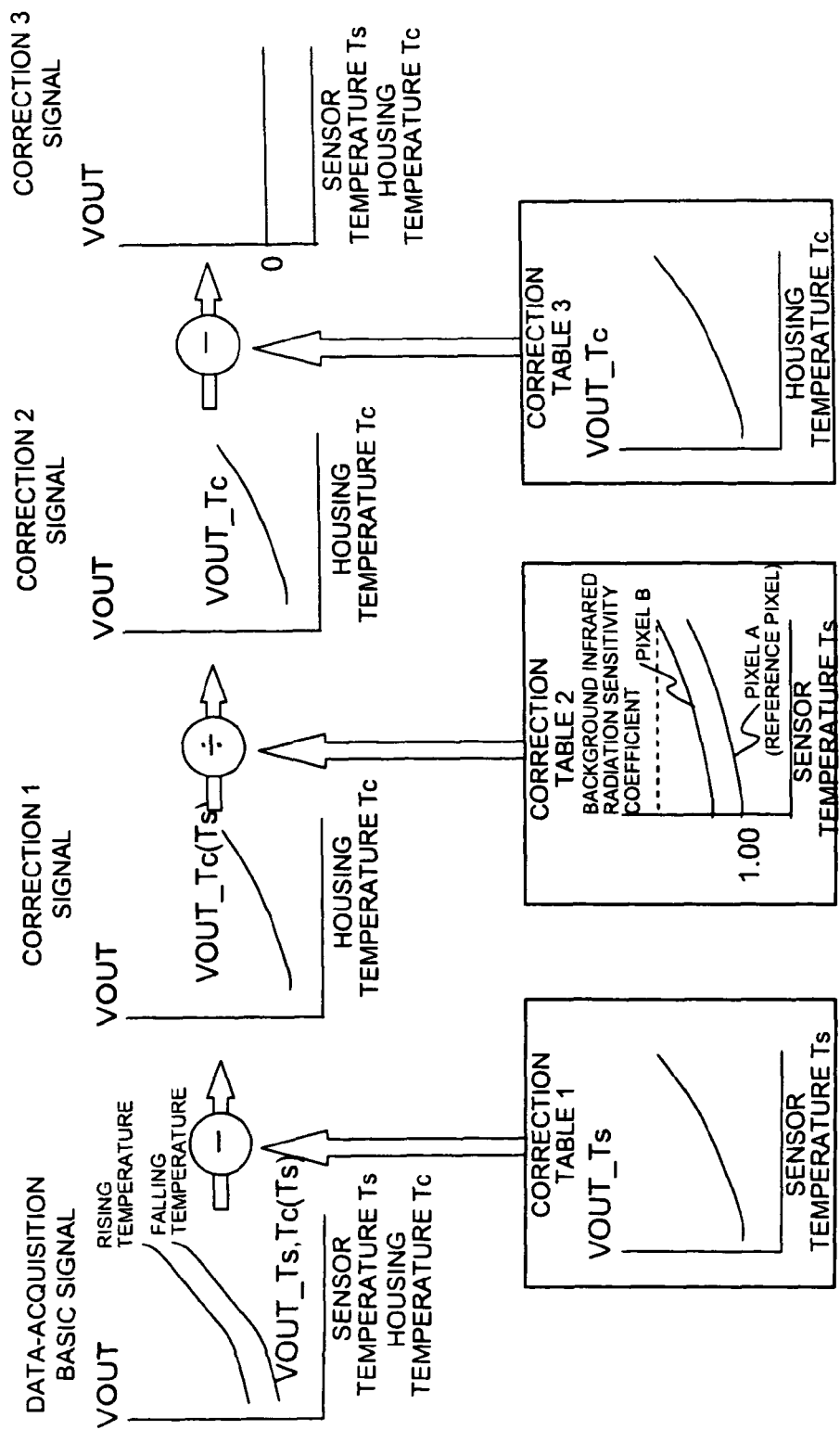
FIG. 19 illustrates the flow of a method of creating various correction tables according to the present invention.

FIG. 19 illustrates the flow of a method of creating the correction tables.

First, in order to isolate the component due to the variation in sensor temperature, the component due to the variation in background infrared radiation and the component due to the variation in incident infrared radiation, data representing the sensor output signal is acquired while varying the temperature of an isothermal bath during the imaging of temperature of a flat light source at a certain temperature (the component due to the variation in incident infrared radiation is excluded).

First, the sensor output signal prevailing when data is acquired in the vacuum-sealed state is a signal in a state that includes a correlation between sensor temperature and housing temperature at the time of data acquisition. The signal in this state shall be referred to as a "data-acquisition basic signal".

The Correction Table 1 representing the relationship between sensor temperature, and sensor output signal is created first in accordance with the method described above.

A correction value calculated from this Correction Table 1 and sensor temperature that prevailed at acquisition of the data-acquisition basic signal is subtracted from the data-acquisition basic signal. The signal in this state shall be referred to as a "Correction 1 signal".

The Correction 1 signal is a signal in a state that includes both (1) the effects of a change in output voltage sensitivity ascribable to a change in sensor temperature at the time of data acquisition and (2) the effects of the intensity distribution of background infrared radiation.

Accordingly, it is necessary to correct for these effects as well.

By way of example, as illustrated in FIG. 18, sensor output signals are acquired for two housing temperatures at upper and lower limits of desired sensor temperatures. Calculated from this data are coefficients for a certain reference pixel and another pixel of the sensor array in such a manner that sensitivity of the reference pixel with respect to background infrared radiation and sensitivity of the other pixel will be rendered constant, and the Correction Table 2 representing the relationship between sensor temperature and coefficient of sensitivity of background infrared radiation is created.

A correction value calculated from this Correction Table 2 and sensor temperature that prevailed at acquisition of the data-acquisition basic signal is used to divide the Correction 1 signal. The signal in this state shall be referred to as a "Correction 2 signal".

The Correction 2 signal is the output characteristic of the sensor output signal versus a uniform housing temperature within the plane of the array. Accordingly, the Correction Table 3 representing the relationship between the housing temperature and the sensor output signal is created from the Correction 2 signal. This correction calibrates the error in the indicated value of temperature in a case where the sensor is applied as a radiation thermometer, as mentioned above. The correction is not always required in an application in which an absolute value of temperature is unnecessary, as in the case of a surveillance (or monitoring) camera.

A correction value calculated from this Correction Table 3 and housing temperature that prevailed at acquisition of the data-acquisition basic signal is subtracted from the Correction 2 signal. The signal in this state shall be referred to as a "Correction 3 signal".

The condition under which the data-acquisition basic signal was acquired is that the temperature of a flat light source at a certain temperature is imaged (i.e., the condition that incident infrared radiation is constant). The Correction 3 signal, therefore, is a signal in which a precise correction has been made for each component of temperature variation.

Next, with regard to Correction Table 4 that corrects the sensitivity coefficient versus incident infrared radiation, the temperature of the flat light source is imaged at points at both ends of the desired range of sensor temperatures after the above-mentioned Correction Tables 1 to 3 have been created, and the sensor output signal is acquired. This signal shall be referred to as an "incidence-data acquisition signal".

Figure 20:
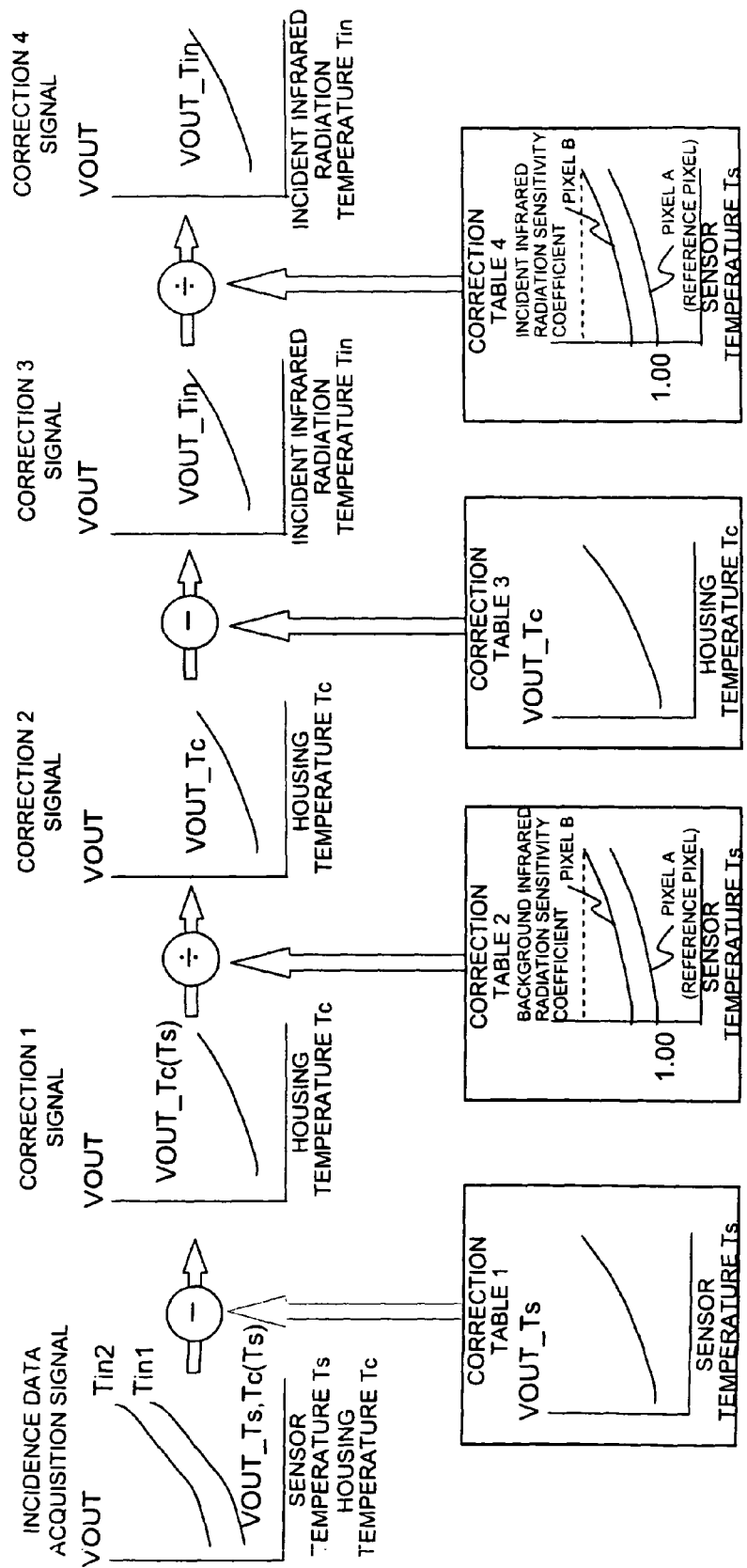
FIG. 20 illustrates the flow of a method of creating a certain correction table according to the present invention.

FIG. 20 illustrates the flow of a method of creating Correction Table 4.

With respect to this incidence-data acquisition signal, from the data that has undergone the corrections of Correction Tables 1 to 3, coefficients are calculated for a certain reference pixel and another pixel of the sensor array in such a manner that sensitivity of the reference pixel with respect to incident infrared radiation and sensitivity of the other pixel will be rendered constant, and the Correction Table 4 representing the relationship between the sensor temperature and the coefficient of sensitivity of incident infrared radiation is created.

The Correction 3 signal is divided by a correction value calculated based upon the Correction Table 4 and the sensor temperature that prevailed at acquisition of the incidence-data acquisition signal. The signal in this state shall be referred to as a "Correction 4 signal".

The signal that has been subjected to correction processing based upon Correction Tables 1 to 4 is a signal that excludes (i.e., is freed from) the effects of the component due to the variation in sensor temperature and of the component due to the variation in background infrared radiation and corresponds solely to the incident infrared radiation that reaches the sensor through the lens. A sharp infrared image is obtained as a result.

Each correction table created in accordance with the above-described flow divides the range of environmental temperatures in which the sensor is capable of operating into a plurality of portions and is provided for each of the temperature regions.

Figure 21:
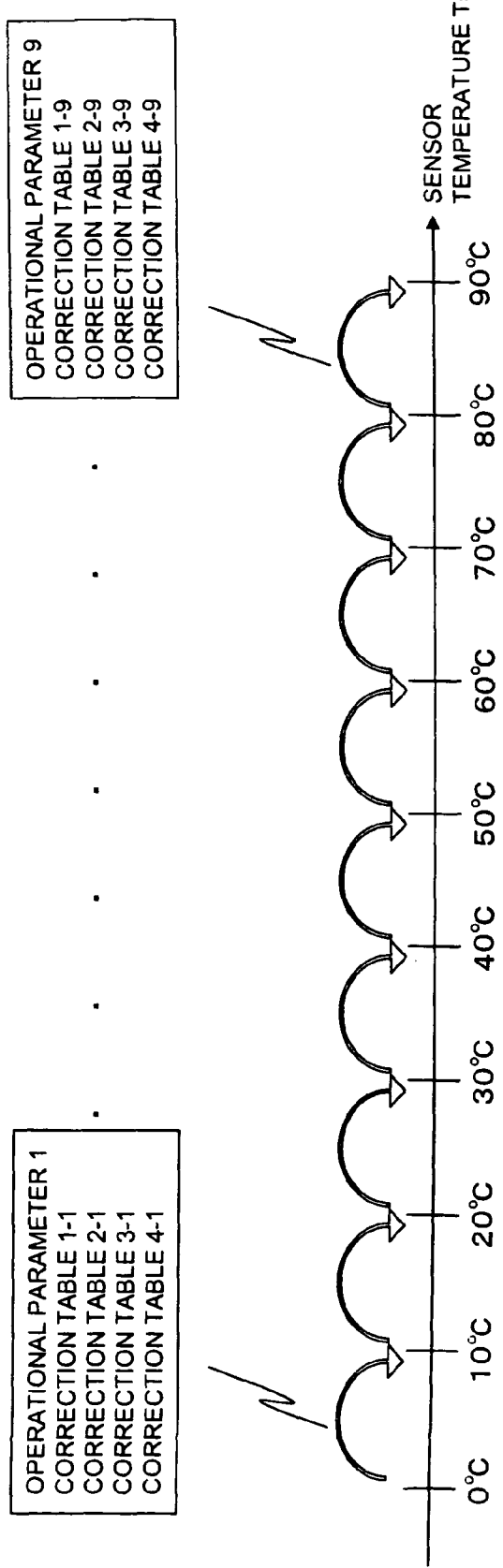
FIG. 21 illustrates an example of correction tables according to the present invention.

FIG. 21 illustrates an example of correction tables according to the present invention. In this example, correction tables are provided every 10° C. over a temperature region of 0 to 90° C.

Further, sensor-related operational parameters that prevailed at creation of these correction tables also are recorded in the correction tables.

Figure 22:
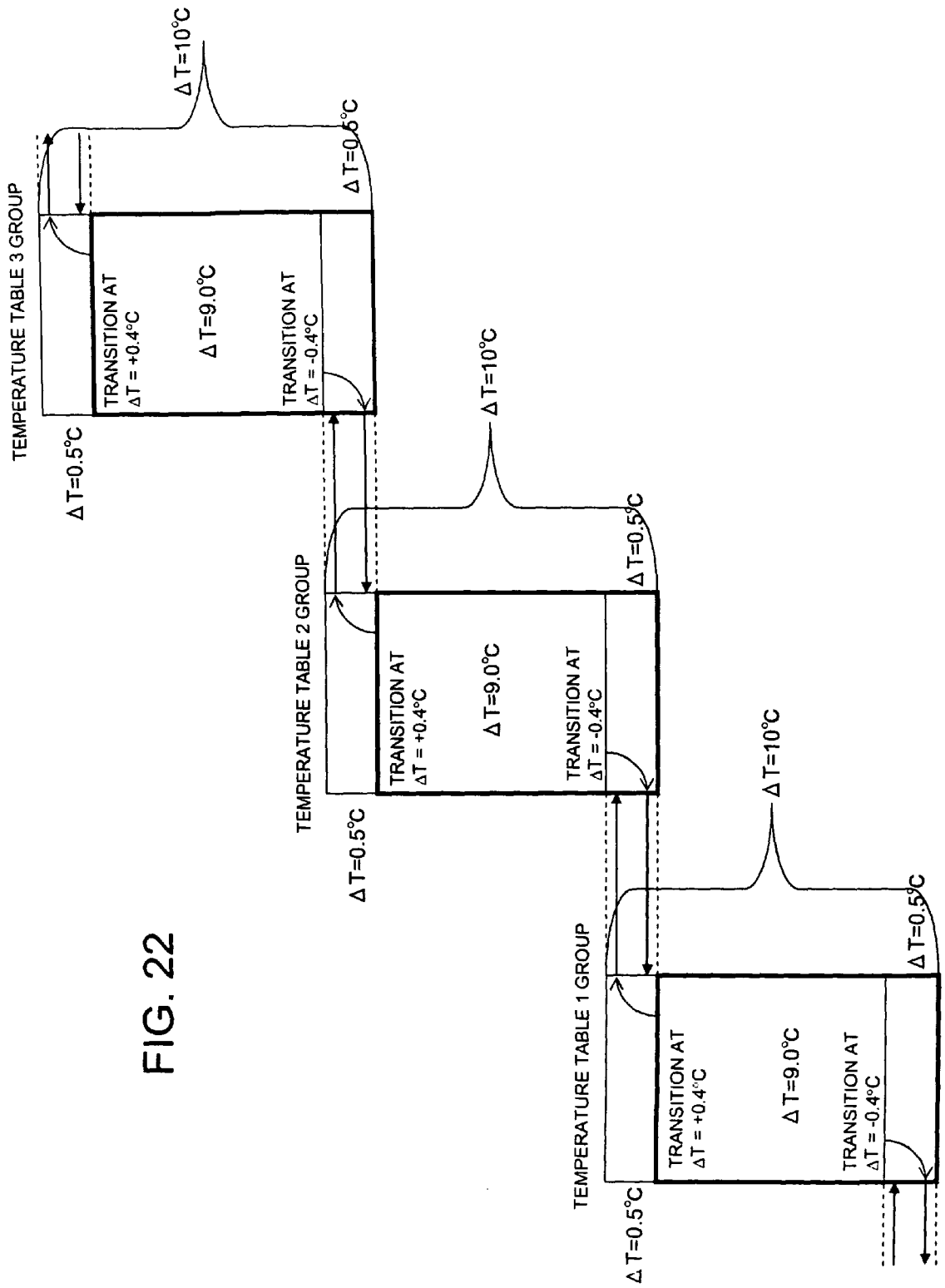
FIG. 22 is a schematic view illustrating timing for changing over between correction tables at various temperatures according to the present invention.

FIG. 22 illustrates timing for changing over between correction tables for each of the temperatures.

In a case where the temperature(s) of the environment at the time of imaging be such that may straddle correction tables (e.g., ranges over two or more correction tables) and it is therefore necessary to change over a correction table, a smooth changeover of the correction table so as not to cause the image to freeze to the greatest extent possible is desired to be carried out. In a case where a temperature interval (or range) for acquiring a correction table is 10° C., therefore, it is preferred that, e.g., 0.5° C. at the upper and lower ends of the acquired temperature interval (or range) be provided as transitional areas and that the changeover temperature of the correction table be provided with a hysteresis characteristic at sensor temperature rise and fall in the transitional areas.

In this example, therefore, the effective Peltier temperature range is 9° C. If we assume that the sensor is used in a range of environmental temperatures of 0 to 90° C., then it will be necessary to create ten groups of correction tables.

Thus, by virtue of the method and apparatus for compensating an infrared sensor for temperature according to the invention, it is possible to apply a correction to the background infrared radiation absorption intensity distribution, which is the effect of both a change in sensitivity, due to a change in sensor temperature, and the intensity distribution of background infrared radiation.

That is, a first correction table indicating correspondence among sensor temperature from a thermometer provided on an infrared sensor, sensitivity of the infrared sensor and intensity distribution of background infrared radiation (light other than the directly incident infrared radiation) is created in advance, and temperature compensation is realized by executing correction processing for correcting an output signal obtained from the infrared sensor using a correction value obtained from the first correction table based upon temperature information from the first thermometer at the time of normal imaging.

Furthermore, the amount of change in background infrared radiation can be corrected by the method and apparatus for compensating an infrared sensor for temperature according to the present invention.

That is, a second correction table indicating correspondence between temperature obtained by a second thermometer provided on a portion (e.g., housing, case, body or like member) forming the source of background infrared radiation and an output signal from an infrared sensor conforming to the intensity of the background infrared radiation (namely light other than the directly incident infrared radiation) is created in advance, and a correction is performed by executing correction processing for correcting an output signal obtained from the infrared sensor using a correction value obtained from the second correction table based upon information representing housing temperature at the time of normal imaging.

As many apparently widely different examples of the present invention can be made without departing from the spirit and scope thereof, it is to be understood that the invention is not limited to the specific examples thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

EXPLANATION OF SYMBOLS 11, 39 bias generator;
20 temperature compensation circuit;
28 integral amplifier;
29 gain correction;
30 offset correction;
31, 72 transistor;
34A trans impedance amplifier;
35 feedback circuit;
60 A/D converter;
61 frame memory;
62 image display device;
63 data register/load circuit;
64 timing generator;
65 data processing device;
66 memory for data processing device;
67 correction coefficient memory;
70 readout circuit;
102 casing;
103 PKG (package);
105 window;
106 heat sink;
109 thermal resistance of air;
110 thermal resistance of casing;

111 thermal capacity of casing;
112 thermal resistance of heat sink;
113 thermal capacity of heat sink; and
119 monitor.

What is claimed is:

1. A method of compensating an infrared sensor for a temperature, wherein an output voltage of each of a plurality of bolometers comprising a bolometer array comprising the infrared sensor is compensated, said method comprising:

correcting a variation in the output voltage due to a temperature characteristic of said each bolometer of said plurality of bolometers included in the bolometer array comprising the infrared sensor;

correcting a variation in said output voltage due to an intensity distribution of an incident infrared radiation to be measured on the infrared sensor and the temperature characteristic of each bolometer;

correcting a variation in said output voltage due to an intensity distribution of background infrared radiation, referred to as "background infrared radiation absorption intensity distribution" hereinafter, which comprises light other than the incident infrared radiation on the infrared sensor, and the temperature characteristic of each bolometer, said correcting the variation in said output voltage due to said intensity distribution of background infrared radiation comprising:

measuring a temperature of the infrared sensor; and correcting a variation in said output voltage by referring to a first table, which indicates the background infrared radiation absorption intensity distribution versus the temperature of the infrared sensor, and the measured temperature of the infrared sensor to find a correction value of output voltage of each bolometer; and correcting a uniform voltage variation corresponding to said intensity of the background infrared radiation, which comprises light other than the incident infrared radiation on the infrared sensor, said correcting the uniform voltage variation corresponding to said intensity of the background infrared radiation comprising:

measuring a temperature of a source of generation of the background infrared radiation as a second temperature; and correcting a variation in output voltage by referring to a second table, which indicates the intensity of the background infrared radiation versus the temperature of the source of generation of the background infrared radiation, and the second temperature, and finding a correction value of the uniform output voltage, wherein said first table is formulated by:

under a vacuum sealed condition of the back round infrared sensor, measuring temperatures of the infrared sensor and a source of generation of the background infrared radiation and said output voltage by varying a temperature of surroundings of the infrared sensor from a first temperature to a second temperature;

under the vacuum sealed condition of the infrared sensor, measuring the temperatures of the infrared sensor and the source of, generation of the background infrared radiation and said output voltage, by varying the temperature of the surroundings of the infrared sensor from the second temperature to the first temperature;

including measured values of said output voltage under at least two temperature conditions of said infrared sensor versus a certain temperature of said source of generation of the background infrared radiation as an entry in the first table.

2. The method according to claim 1, further comprising forming the first table, the forming comprising:

placing the infrared sensor in an isothermal bath; and varying a temperature of the isothermal bath to isolate and find a characteristic of change of the infrared sensor.

3. The method according to claim 1, wherein said second table is formulated by:

under the vacuum sealed condition of the infrared sensor, and said output voltage, measuring temperatures of the infrared sensor and a source of generation of the background infrared radiation by varying temperature of surroundings of the infrared sensor from the first temperature to the second temperature;

under the vacuum sealed condition of the infrared sensor, and said output voltage, measuring the temperatures of the infrared sensor and the source of generation of the background infrared radiation by varying a temperature of the surroundings of the infrared sensor from the second temperature to the first temperature; and using measured values of said output voltage under at least two temperature conditions of said infrared sensor versus a certain temperature of said source of generation of the background infrared radiation.

4. An apparatus for compensating an infrared sensor for a temperature, wherein an output voltage of each bolometer of a bolometer array of the infrared sensor is compensated, said apparatus comprising:

a table for correcting a variation in an output voltage due to a temperature characteristic of said each bolometer included in the bolometer array comprising the infrared sensor;

a table for correcting a variation in said output voltage due to an intensity distribution of an incident infrared radiation to be measured on the infrared sensor and a difference in the temperature characteristics of the respective bolometers;

background infrared radiation absorption, intensity distribution correcting means for correcting a variation in said output voltage due to an intensity distribution of background infrared radiation, referred to as "background infrared radiation absorption intensity distribution" hereinafter, which comprises light other than the incident infrared radiation on the infrared sensor, and a difference in the temperature characteristics of the respective bolometers, said background infrared radiation absorption intensity distribution correcting means including:

a first table indicating the background infrared radiation absorption intensity distribution versus the temperature of the infrared sensor; and a first thermometer for measuring a temperature of the infrared sensor, wherein a variation in said output voltage is corrected by referring to the temperature of the infrared sensor measured by said first thermometer and the first table, and to find a correction value of said output voltage of each bolometer; and a background infrared radiation intensity correcting means for correcting a uniform voltage variation corresponding to said intensity of background infrared radiation, which comprises light other than the incident infrared radiation on the infrared sensor, said background infrared radiation intensity correcting means including:

a second table indicating said intensity of the background infrared radiation versus temperature of a source of generation of the background infrared radiation; and a second thermometer for measuring said temperature of the source of generation of the background infrared radiation, wherein a variation in said output voltage is corrected by referring to the second temperature measured by said second thermometer and said second table, and finding a correction value of uniform output voltage, wherein said first table is formulated by:
under a vacuum sealed condition of the background infrared sensor, measuring temperatures of the infrared sensor and a source of generation of the background infrared radiation and said output voltage, by varying temperature of surroundings of the infrared sensor from a first temperature to a second temperature;

under the vacuum sealed condition of the background infrared sensor, and said output voltage, measuring the temperatures of the infrared sensor and the source of generation of the background infrared radiation by varying the temperature of the surroundings of the infrared sensor from the second temperature to the first temperature; and sin measured values of said output voltage under at least two temperature conditions of said infrared sensor versus a certain temperature of said source of generation of the background radiation.

5. The apparatus according to claim 4, wherein said second table is formulated by:
under the vacuum sealed condition of the infrared sensor, and said output voltage, measuring temperatures of the infrared sensor and a source of generation of the background infrared radiation by varying temperature of surroundings of the infrared sensor from the first temperature to the second temperature;

under the vacuum sealed condition of the infrared sensor, and said output voltage, measuring the temperatures of the infrared sensor and the source of generation of the background infrared radiation by varying a temperature of, the surroundings of the infrared sensor from the second temperature to the first temperature; and using measured values of said output voltage under at least two temperature conditions of said infrared sensor versus a certain temperature of said source of generation of the background infrared radiation.

6. An apparatus for compensating an infrared sensor for temperature wherein an output voltage of each bolometer of a bolometer array of the infrared sensor is compensated, said apparatus comprising:
a table for correcting a variation in an output voltage due to a temperature characteristic of said each bolometer included in the bolometer array comprising the infrared sensor;

a table for correcting a variation in said output voltage due to an intensity distribution of an incident infrared radiation to be measured on the infrared sensor and a difference in the temperature characteristics of the respective bolometers;

a background infrared radiation absorption intensity distribution correcting unit that corrects a variation in said output voltage due to an intensity distribution of background infrared radiation referred to as "background infrared radiation absorption intensity distribution" hereinafter, which comprises light other than the incident infrared radiation on the infrared sensor, and a difference in the temperature characteristics of the respective bolometers, said background infrared radiation absorption intensity distribution correcting unit including:
a first table indicating the background infrared radiation absorption intensity distribution versus a temperature of the infrared sensor; and a first thermometer for measuring the temperature of the infrared sensor, wherein a variation in output voltage is corrected by referring to the first temperature measured by said first thermometer and the first table, and finding a correction value of output voltage of each bolometer, and a background infrared radiation intensity correcting unit that corrects a uniform voltage variation corresponding to said intensity of background infrared radiation, which comprises light other than the incident infrared radiation on the infrared sensor, said background infrared radiation intensity correcting unit including:
a second table indicating said intensity of the background infrared radiation versus a temperature of a source of generation of the background infrared radiation; and a second thermometer for measuring the temperature of the source of generation of the background infrared radiation, wherein a variation in output voltage is corrected by referring to the second temperature measured by said second thermometer and said second table, and finding a correction value of uniform output voltage, wherein said first table is formulated by:
measuring temperatures of the infrared sensor and a source of generation of the background infrared radiation under a vacuum sealed condition of the background infrared sensor, and said output voltage, by varying temperature of surroundings of the infrared sensor from a first temperature to a second temperature;

measuring the temperatures of the infrared sensor and the source of generation of the background infrared radiation under the vacuum sealed condition of the background infrared sensor, and said output voltage, by varying a temperature of the surroundings of the infrared sensor from the second temperature to the first temperature; and using measured values of said output voltage under at least two temperature conditions of said infrared sensor versus a certain temperature of said source of generation of the background radiation.

7. The apparatus according to claim 6, wherein the infrared sensor is thermally isolated from a substrate of the infrared sensor.

8. The apparatus according to claim 6, wherein the infrared sensor is vacuum-sealed.

9. The apparatus according to claim 6, wherein said second table is formulated by:
under a vacuum sealed condition of the infrared sensor, and said output voltage, measuring temperatures of the infrared sensor and a source of generation of the background infrared radiation by varying temperature of surroundings of the infrared sensor from the first temperature to the second temperature;

under the vacuum sealed condition of the infrared sensor, and said output voltage, measuring the temperatures of the infrared sensor and the source of generation of the background infrared radiation by varying a temperature of the surroundings of the infrared sensor from the second temperature to the first temperature; and using measured values of said output voltage under at least two temperature conditions of said infrared sensor versus a certain temperature of said source of generation of the background infrared radiation.

* * * * *